United States Patent
Ide et al.

(10) Patent No.: US 9,762,126 B2
(45) Date of Patent: Sep. 12, 2017

(54) ELECTRIC POWER CONVERTER

(71) Applicant: TOYOTA JIDOSHA KABUSHIKI KAISHA, Toyota-shi, Aichi-ken (JP)

(72) Inventors: Akihiko Ide, Okazaki (JP); Hidetsugu Hamada, Toyota (JP); Masatoshi Shinohara, Toyota (JP); Shohei Sunahara, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 181 days.

(21) Appl. No.: 14/933,505

(22) Filed: Nov. 5, 2015

(65) Prior Publication Data
US 2016/0134148 A1     May 12, 2016

(30) Foreign Application Priority Data
Nov. 6, 2014 (JP) ................. 2014-226281

(51) Int. Cl.
*H02J 7/00* (2006.01)
*H02M 3/158* (2006.01)

(52) U.S. Cl.
CPC ........... *H02M 3/158* (2013.01); *H02J 7/0024* (2013.01); *Y02T 10/7055* (2013.01)

(58) Field of Classification Search
None
See application file for complete search history.

(56) References Cited

U.S. PATENT DOCUMENTS

2013/0134786 A1   5/2013   Ishigaki et al.
2014/0145694 A1   5/2014   Ishigaki et al.

FOREIGN PATENT DOCUMENTS

JP     2012-070514 A     4/2012
JP     2013-013234 A     1/2013

*Primary Examiner* — Jared Fureman
*Assistant Examiner* — Aqeel Bukhari
(74) *Attorney, Agent, or Firm* — Sughrue Mion, PLLC

(57) ABSTRACT

An electric power conversion unit of an electric power converter establishes two converter circuits including four switching elements and two batteries and carries out electric power conversion in a parallel mode in which the batteries are connected in parallel with each other. A controller is configured to set a control signal for each of the switching elements, identify a target switching element of which a temperature is suppressed, determine a state having a maximum loss value in correspondence with input-output data, and execute phase control for suppressing the maximum loss value.

6 Claims, 15 Drawing Sheets

FIG. 5

|  |  | S1 | S2 | S3 | S4 |
|---|---|---|---|---|---|
| C1 | DR1 |  |  | ON | ON |
|  | (1-DR1) | ON | ON |  |  |
| C2 | DR2 |  | ON | ON |  |
|  | (1-DR2) | ON |  |  | ON |

FIG. 6

|  | (ON STATE) LOGICAL EXPRESSION |
|---|---|
| S1 | (/PWM1 IS ON) OR (/PWM2 IS ON) |
| S2 | (/PWM1 IS ON) OR (PWM2 IS ON) |
| S3 | (PWM1 IS ON) OR (PWM2 IS ON) |
| S4 | (PWM1 IS ON) OR (/PWM2 IS ON) |
|  | (FIRST SIGNAL IS ON) OR (SECOND SIGNAL IS ON) |

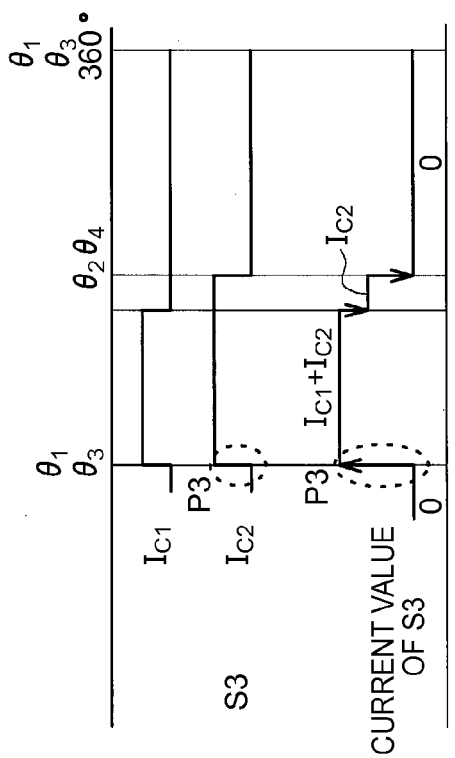
FIG. 11A
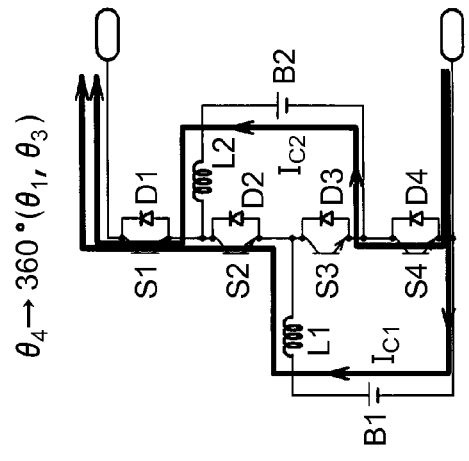
FIG. 11B
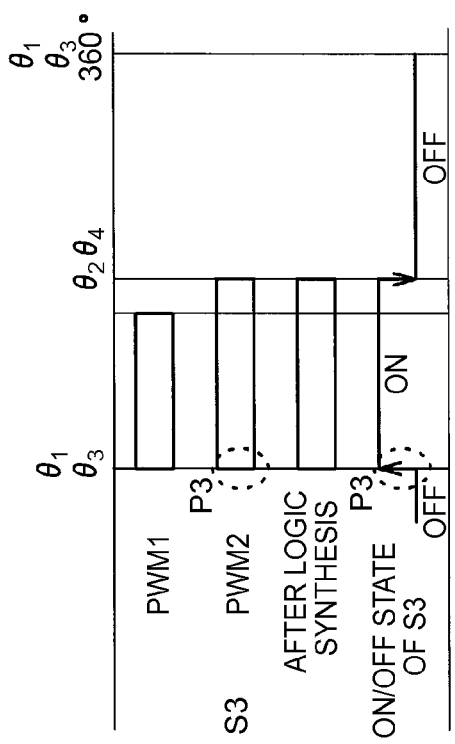
FIG. 11C
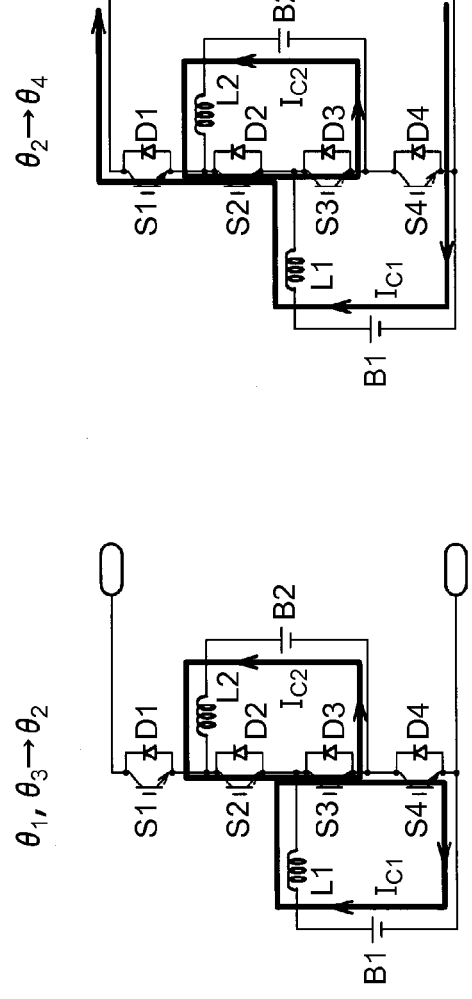
FIG. 11D
FIG. 11E

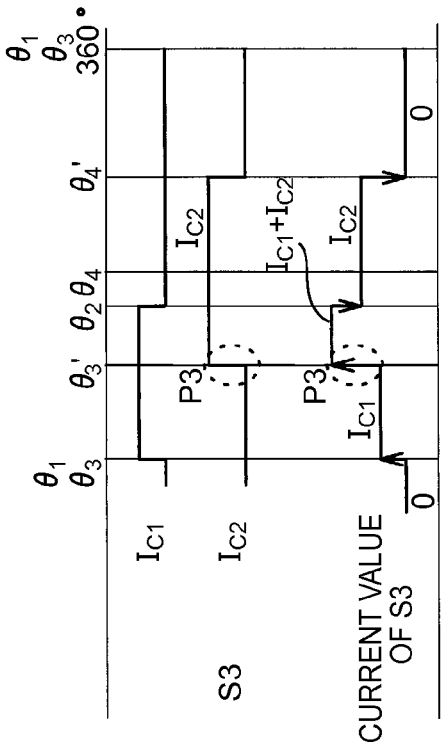
FIG. 12A
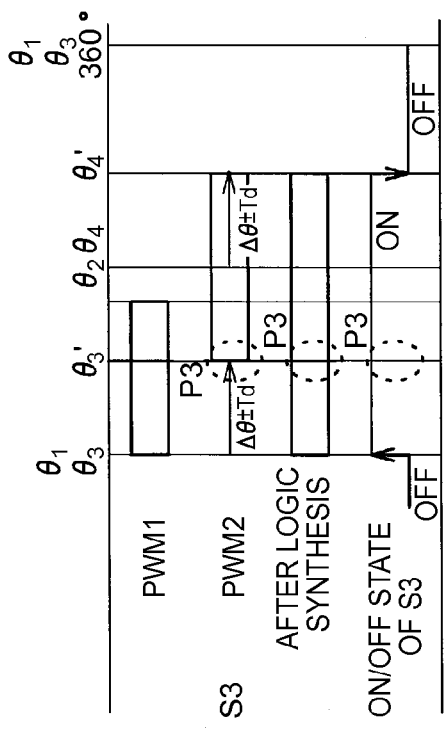
FIG. 12B
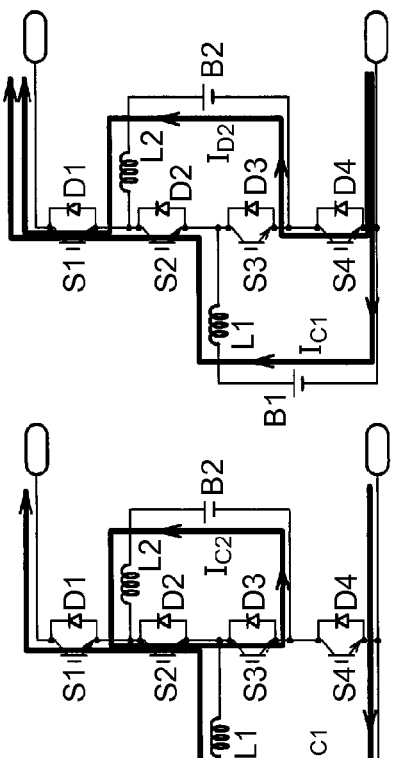
FIG. 12C
FIG. 12D
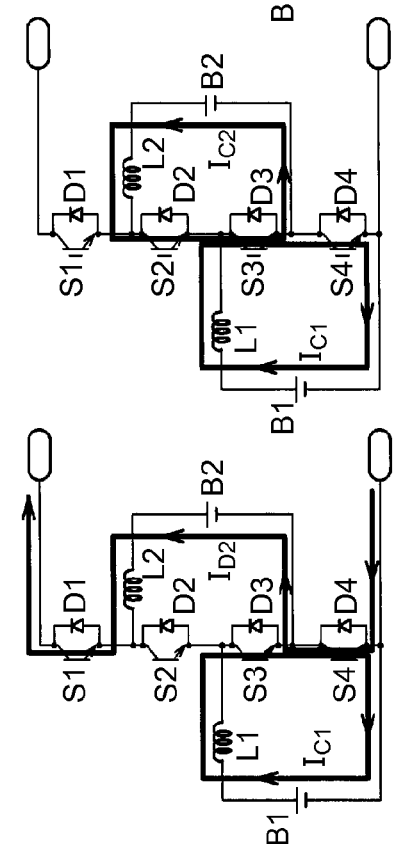
FIG. 12E
FIG. 12F

ELECTRIC POWER CONVERTER

INCORPORATION BY REFERENCE

The disclosure of Japanese Patent Application No. 2014-226281 filed on Nov. 6, 2014 including the specification, drawings and abstract is incorporated herein by reference in its entirety.

BACKGROUND OF THE INVENTION

1. Field of the Invention

The invention relates to an electric power converter and, more particularly, to a series-parallel switching-type electric power converter that converts voltage between an output power line, connected to a load, and two batteries and that switches between a series mode in which electric power is converted between the output power line and the two batteries while the two batteries are connected in series with each other and a parallel mode in which electric power is converted between the output power line and each of the batteries in parallel with each other.

2. Description of Related Art

In a hybrid vehicle, an electric vehicle, or the like, that uses a rotary electric machine as a drive source, direct-current power of a battery is converted to alternating-current power by an inverter, and the rotary electric machine is driven by the alternating-current power. An electric power converter is provided between the battery and the inverter. The electric power converter steps up or steps down direct-current voltage.

Japanese Patent Application Publication No. 2012-070514 (JP 2012-070514 A) describes a configuration in which the function of an electric power converter is extended. This configuration has a series mode and a parallel mode for converting voltage between an output power line, connected to a load, and two batteries. In the series mode, electric power is converted between the output power line and the two batteries while the two batteries are connected in series with each other. In the parallel mode, electric power is converted between the output power line and each of the batteries in parallel with each other.

Japanese Patent Application Publication No. 2013-013234 (JP 2013-013234 A) describes a configuration that reduces a loss of an electric power converter by, in the parallel mode of JP 2012-070514 A, setting a phase difference between pulse width modulation (PWM) signals in two step-up circuits to 180 degrees.

As in the case of JP 2013-013234 A, at the time of reducing the loss of the electric power converter in the parallel mode, it is desirable to reduce a switching loss of a specific switching element of which generation of heat is intended to be suppressed, without limiting the output characteristic of the electric power converter.

SUMMARY OF THE INVENTION

The invention provides an electric power converter that includes a plurality of switching elements and that is able to suppress a switching loss of a specific switching element without limiting an output voltage value or an output current value.

An aspect of the invention provides an electric power converter including a first battery, a second battery, a plurality of switching elements and a controller. The controller is configured to execute ON-OFF control over the plurality of switching elements. The electric power converter has a parallel mode and a series mode and is able to switch between both modes. In the parallel mode, electric power conversion between the first battery and an output power line and electric power conversion between the second battery and the output power line are individually carried out, and the two electric power conversions are carried out in parallel with each other. In the series mode, electric power conversion between both the first battery and the second battery and the output power line is carried out while the first battery and the second battery are connected in series with each other. The controller is configured to: (i) in the parallel mode, control the electric power conversion between the first battery and the output power line with the use of a first PWM signal, control the electric power conversion between the second battery and the output power line with the use of a second PWM signal, determine an ON-OFF state of each of the plurality of switching elements based on a combination of a first signal, which is the first PWM signal or an inversion signal of the first PWM signal, and a second signal, which is the second PWM signal or an inversion signal of the second PWM signal, and set each of the switching elements in the ON state when the corresponding first signal or the corresponding second signal is in the ON state; (ii) determine a specific one of the plurality of switching elements, of which the number of switching times is suppressed; (iii) set a control phase of the first signal and a control phase of the second signal; and (iv) when the electric power converter operates in the parallel mode, set a phase difference between the first signal and the second signal for the specific switching element such that the second signal enters the ON state in a period in which the first signal is in the ON state or set the phase difference between the first signal and the second signal for the specific switching element such that the first signal enters the ON state in a period in which the second signal is in the ON state.

With the configuration of the above-described electric power converter, in the parallel mode of the electric power converter, the ON-OFF state of each of the plurality of switching elements is determined based on a combination of the first signal, which is the first PWM signal or the inversion signal of the first PWM signal, and the second signal, which is the second PWM signal or the inversion signal of the second PWM signal. The output voltage value and output current value of the electric power converter depend on the duty ratio of the first signal and the duty ratio of the second signal, so, even when the phase difference of the second signal with respect to the first signal is changed, the output voltage value and output current value of the electric power converter remain unchanged. By appropriately setting the phase difference between the first signal and the second signal by the use of this characteristic of the parallel mode, it is possible to bring the ON-OFF state of the first signal and the ON-OFF state of the second signal into coincidence with the ON-OFF states of the plurality of switching elements or make the ON-OFF state of the first signal and the ON-OFF state of the second signal different from the ON-OFF states of the plurality of switching elements while the output characteristic of the electric power converter remains unchanged.

The controller of the electric power converter is configured to determine a specific one of the plurality of switching elements, of which the number of switching times is suppressed, and set a control phase of the first signal and a control phase of the second signal. The control phase is set by setting the phase difference between the first signal and the second signal for the specific switching element such that the second signal enters the ON state in the period in which the first signal is in the ON state or setting the phase difference between the first signal and the second signal for the specific switching element such that the first signal enters the ON state in the period in which the second signal is in the ON state. The ON-OFF state of each switching element is determined based on a combination of the ON-OFF state of the corresponding first signal and the ON-OFF state of the corresponding second signal. When the first signal or the second signal is in the ON state, the switching element enters the ON state, so, by setting the phase difference between the first signal and the second signal as described above, it is possible to suppress the number of times the specific switching element turns on or off while the number of times the signals turn on or off remains unchanged. Thus, for example, by setting the specific switching element for the switching element having the largest amount of heat generation, it is possible to suppress the number of times the switching element having the largest amount of heat generation turns on or off, so it is possible to suppress a switching loss of the specific switching element without limiting the output voltage value or the output current value in the electric power converter.

In the electric power converter, the controller may be configured to (i) in the specific switching element, identify switching timing of a signal, at which a maximum switching loss arises, among switching losses that arise as a result of switching of the signal, that is, the switching between ON-OFF states of the first signal or the switching between ON-OFF states of the second signal; and (ii) set the phase difference such that switching timing between the ON-OFF states of the specific switching element does not overlap with the switching timing of the signal at which the maximum switching loss arises.

With the above electric power converter, in the specific switching element, the switching timing of the signal, at which the maximum switching loss arises, is identified among switching losses that arise as a result of switching of the signal, that is, the switching between the ON-OFF states of the first signal or the switching between the ON-OFF states of the second signal The phase difference is set such that the switching timing between the ON-OFF states of the specific switching element does not overlap with the switching timing of the signal, at which the maximum switching loss arises. Therefore, by appropriately setting the phase difference, the on-off timing of the signal, at which the maximum switching loss arises, is made different from the on-off timing of the switching element, so it is possible to reduce the switching loss of the specific switching element.

In the electric power converter, the controller may be configured to determine the switching loss based on a voltage value of the first battery, a voltage value of the second battery, a current flowing through each battery, and an output voltage of a load.

With the above-described electric power converter, the switching loss is determined based on the voltage value of the first battery, the voltage value of the second battery, the current flowing through each battery, and the output voltage of the load. The on-off switching timing of the first signal and the on-off switching timing of the second signal are four timings, that is, the rising timing and falling timing of the first signal and the rising timing and falling timing of the second signal. With the above-described electric power converter, it is possible to calculate the switching loss in advance for these four signal switching timings, so it is possible to identify in advance the signal switching timing at which the maximum switching loss arises.

In the electric power converter, the controller may be configured to, when each of the switching timing between the ON-OFF states of the first signal and the switching timing between the ON-OFF states of the second signal is such that the switching timing of the signal, at which the maximum switching loss arises, is falling timing, determine whether the switching timing at which the maximum switching loss arises is the falling timing of the first signal or the falling timing of the second signal.

With the above-described electric power converter, when the electric power converter is configured such that each of the on-off switching timing of the first signal and the on-off switching timing of the second signal is such that the switching timing of the signal, at which the maximum switching loss arises, is the falling timing, it is possible to determine the maximum loss by determining whether the switching timing at which the maximum switching loss arises is the falling timing of the first signal or the falling timing of the second signal. Thus, it is only necessary to make determination for two of the four signal switching timings, so the amount of data for phase control reduces accordingly, and it is possible to reduce a memory capacity.

In the electric power converter, the controller may be configured to, when the sum of the period in which the first signal is in the ON state and the period in which the second signal is in the ON state is longer than one period of the PWM control, cause the specific switching element not to turn on or off over one period of the PWM control by setting the phase difference for the specific switching element such that a rising edge and falling edge of the first signal arise in the period in which the second signal is in the ON state or setting the phase difference such that a rising edge and falling edge of the second signal arise in the period in which the first signal is in the ON state.

With the above-described electric power converter, when the sum of the period in which the first signal is in the ON state and the period in which the second signal is in the ON state is longer than one period of the PWM control, the specific switching element is caused not to turn on or off over one period of the PWM control by setting the phase difference for the specific switching element such that the rising edge and falling edge of the first signal arise in the period in which the second signal is in the ON state or setting the phase difference for the specific switching element such that the rising edge and falling edge of the second signal arise in the period in which the first signal is in the ON state, so it is possible to minimize the switching loss.

Furthermore, in the electric power converter, the controller may be configured to, when the electric power converter is configured such that a step-up ratio in the electric power conversion between the first battery and the output power line and a step-up ratio in the electric power conversion between the second battery and the output power line are determined in advance, set the phase difference between the first signal and the second signal to a phase difference within an applicable phase difference range under the step-up ratios determined in advance.

With the above-described electric power converter, when the electric power converter is configured such that the step-up ratio in the electric power conversion between the first battery and the output power line and the step-up ratio in the electric power conversion between the second battery and the output power line are determined in advance, the duty ratios are determined, so the applicable phase difference range is limited in advance. By setting the phase difference between the first signal and the second signal in advance to a phase difference within the limited phase difference range, it is possible to reduce load in computing the phase difference. For example, it is possible to set the phase difference between the first signal and the second signal in advance to a phase difference that is a median value in the limited phase difference range.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a table that shows an ON-OFF state of each of switching elements at the time when a PWM signal is in an ON state and a /PWM signal, which is an inversion signal of the PWM signal, is in an ON state in each of a first circuit and a second circuit at the time of step-up operation in the parallel mode in the electric power converter according to the embodiment of the invention, hereinafter, the inversion signal of the PWM signal is simply referred to as /PWM signal;

FIG. 6 is a table that shows the relationship among an on-off logical value of each switching element, an on-off logical value of the PWM signal and an on-off logical value of the /PWM signal in the electric power converter according to the embodiment of the invention;

FIG. 11A, FIG. 11B, FIG. 11C, FIG. 11D and FIG. 11E are views that show a switching ON-OFF state and changes in current values before phase control in the specific example of FIG. 10;

FIG. 12A, FIG. 12B, FIG. 12C, FIG. 12D, FIG. 12E and FIG. 12F are views that show a switching ON-OFF state and changes in current values after phase control in the specific example of FIG. 10;

DETAILED DESCRIPTION OF EMBODIMENTS

Figure 1:
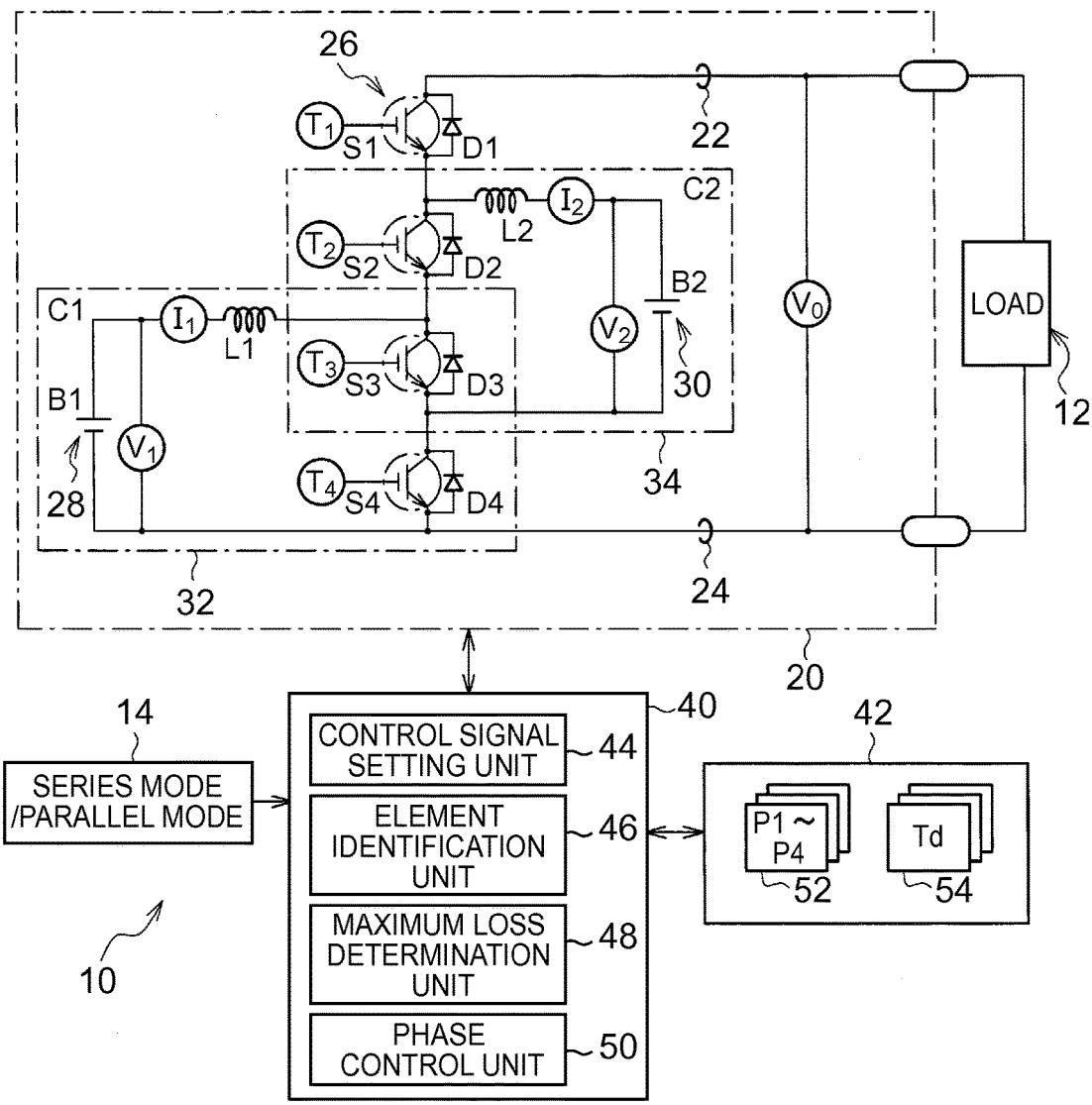
FIG. 1 is a configuration view of an electric power converter according to an embodiment of the invention.

Hereinafter, an embodiment of the invention will be described in detail with reference to the accompanying drawings. In the following description, the number of switching elements that constitute an electric power converter is set to four. The number of the switching elements is only illustrative and may be other than four in some cases. For example, the number of the switching elements may be set to three.

In the following description, an example in which the electric power converter is mounted on a vehicle will be described. However, this is only illustrative, and the electric power converter may be used in applications other than the application in which the electric power converter is mounted on a vehicle. In the following description, like reference numerals denote similar elements in all the drawings, and the overlap description is omitted.

FIG. 1 is a view that shows an electric power converter 10 mounted on a vehicle. The electric power converter 10 includes an electric power conversion unit 20 and a controller 40 for the electric power conversion unit 20. FIG. 1 shows a load 12 and a series mode-parallel mode signal 14. The load 12 is connected to the electric power conversion unit 20. The series mode-parallel mode signal 14 is a command signal to the controller 40. The load 12 is an inverter circuit, or the like, connected to a rotary electric machine, or the like, mounted on the vehicle.

The series mode-parallel mode signal 14 is a command signal that indicates whether to select control in a series mode or control in a parallel mode in response to traveling states of the vehicle, and is transmitted from an integrated controller (not shown) for the vehicle. The traveling states of the vehicle include, for example, a continuous high-speed steady traveling state, a rapid acceleration state, an outside air temperature state, and the like. In response to these traveling states, the integrated controller for the vehicle determines whether to convert electric power by using one of two batteries solely, execute control in the series mode in which the two batteries are connected in series with each other or execute control in the parallel mode in which the two batteries are connected in parallel with each other, and issues a command to the controller 40. The command signal, that is, the series mode-parallel mode signal 14, includes an output voltage value $V_0$, an output current value $I_0$, and the like, which are required of the load 12.

The electric power conversion unit 20 includes a switching element array 26 arranged between two positive and negative output power lines 22, 24 of the load 12. The electric power conversion unit 20 provides a first converter circuit 32 and a second converter circuit 34 respectively for a first battery 28 and a second battery 30. The electric power conversion unit 20 has the parallel mode in which electric power is converted while the first battery 28 and the second battery 30 are connected in parallel with each other.

As shown in FIG. 1, the output power lines 22, 24 are respectively a positive power supply line and a negative power supply line. The word "output power line" is used to mean that a power supply line that outputs and supplies electric power to the load. Of the output power lines 22, 24, the output power line 22 is the positive output power line of the load 12, and corresponds to a positive electrode bus of the electric power conversion unit 20. The output power line 24 is the negative output power line of the load 12, and corresponds to a negative electrode bus of the electric power conversion unit 20. In the example of FIG. 1, the output power line 24 is connected to a negative electrode terminal of the first battery 28. A voltage value between the output power lines 22, 24 is the output voltage value $V_0$ of the electric power conversion unit 20. From another viewpoint, the voltage value between the output power lines 22, 24 is a voltage value of direct-current power that is supplied to the load 12, and is called system voltage. The output voltage value $V_0$ is transmitted to the controller 40 with the use of an adequate signal line.

The switching element array 26 is a series connected array of switching elements that are four power switching transistors arranged between the output power lines 22, 24. An insulated gate bipolar transistor (IGBT) may be used as each of the power switching transistors.

The switching element array 26 is formed of the four switching elements S1, S2, S3, S4 connected in series with each other. A collector terminal of the switching element S1 is connected to the output power line 22. An emitter terminal of the switching element S1 is connected to a collector terminal of the switching element S2. An emitter terminal of the switching element S2 is connected to a collector terminal of the switching element S3. An emitter terminal of the switching element S3 is connected to a collector terminal of the switching element S4. An emitter terminal of the switching element S4 is connected to the output power line 24. A gate terminal of each of the four switching elements S1, S2, S3, S4 is connected to a switching control circuit (not shown) of the controller 40.

Four diodes D1, D2, D3, D4 shown in FIG. 1 are power rectifying elements. Each of the four diodes D1, D2, D3, D4 is connected between the collector and emitter of a corresponding one of the four switching elements S1, S2, S3, S4 in antiparallel with the corresponding one of the four switching elements S1, S2, S3, S4. Antiparallel connection is, for example, a connection method in which a cathode terminal of the diode D1 is connected to the collector terminal of the switching element S1 and an anode terminal of the diode D1 is connected to the emitter terminal of the switching element S1. When the switching element S1 is in an ON state, current flows from the collector terminal side, connected to the output power line 22, to the emitter terminal side, connected to the output power line 24 side via the switching element S2, and the like. In contrast, in the diode D1, current flows from the anode terminal side toward the cathode terminal side.

Temperature sensors $T_1$ to $T_4$ are element temperature detectors that respectively detect element temperatures of the switching elements S1 to S4. In FIG. 1, $T_1$ to $T_4$ denote the temperature sensors, and also denote element temperatures detected by the temperature sensors. This also applies to current sensors and voltage sensors in the following description. The element temperatures $T_1$ to $T_4$ respectively detected by the temperature sensors $T_1$ to $T_4$ are transmitted to the controller 40 with the use of adequate signal lines.

The negative electrode terminal of the first battery 28 denoted by B1 is connected to the output power line 24, and a positive electrode terminal of the first battery 28 is connected via a first reactor L1 to a connection point at which the emitter terminal of the switching element S2 is connected to the collector terminal of the switching element S3. A negative electrode terminal of the second battery 30 denoted by B2 is connected to a connection point at which the emitter terminal of the switching element S3 is connected to the collector terminal of the switching element S4, and a positive electrode terminal of the second battery 30 is connected via a second reactor L2 to a connection point at which the emitter terminal of the switching element S1 is connected to the collector terminal of the switching element S2.

The first battery 28 and the second battery 30 are direct-current power supplies arranged independently of each other. The first battery 28 and the second battery 30 may be batteries having the same characteristic; however, the flexibility of the characteristic of the electric power conversion unit 20 increases when the first battery 28 and the second battery 30 have mutually different characteristics. For example, the first battery 28 may be a high-capacity battery having a high stored energy, and the second battery 30 may be a high-power battery having a high output power. The thus-configured first battery 28 and second battery 30 may be a pair of high-capacity lithium ion battery pack and high-power lithium ion battery pack, a pair of high-capacity nickel-metal hydride battery pack and high-power nickel-metal hydride battery pack, or the like.

The first converter circuit 32 shown as a first circuit C1 is a step-up-step-down circuit established for the first battery 28. The first converter circuit 32 includes the first battery 28, the switching element array 26 and the first reactor L1. The first reactor L1 is provided between the positive electrode terminal of the first battery 28 and the connection point at which the emitter terminal of the switching element S2 is connected to the collector terminal of the switching element S3, and is an element that has the function of storing or releasing electromagnetic energy at the time when the first converter circuit 32 operates. A portion surrounded by the box as the first circuit C1 in FIG. 1 indicates an element that stores electromagnetic energy at the time when the first converter circuit 32 operates, and another element of the switching element array 26 is also used at the time when electromagnetic energy is released.

In the first converter circuit 32, a current sensor $I_1$ is a current detection element that detects a value of current flowing through the first reactor L1, that is, an input current value of the electric power conversion unit 20 from the first battery 28. A voltage sensor $V_1$ is a voltage detection element that detects a value of voltage between the terminals of the first battery 28, that is, an input voltage value of the electric power conversion unit 20 from the first battery 28. The input current value $I_1$ detected by the current sensor $I_1$ and the input voltage value $V_1$ detected by the voltage sensor $V_1$ are transmitted to the controller 40 with the use of adequate signal lines.

The second converter circuit 34 shown as a second circuit C2 is a step-up-step-down circuit established for the second battery 30. The second converter circuit 34 includes the second battery 30, the switching element array 26 and the second reactor L2. The second reactor L2 is provided between the positive electrode terminal of the second battery 30 and the connection point at which the emitter terminal of the switching element S1 is connected to the collector terminal of the switching element S2, and is an element that has the function of storing or releasing electromagnetic energy at the time when the second converter circuit 34 operates. A portion surrounded by the box as the second circuit C2 in FIG. 1 indicates an element that stores electromagnetic energy at the time when the second converter circuit 34 operates, and another element of the switching element array 26 is also used at the time when electromagnetic energy is released.

In the second converter circuit 34, a current sensor $I_2$ is a current detection element that detects a value of current flowing through the second reactor L2, that is, an input current value of the electric power conversion unit 20 from the second battery 30. A voltage sensor $V_2$ is a voltage detection element that detects a value of voltage between the terminals of the second battery 30, that is, an input voltage value of the electric power conversion unit 20 from the second battery 30. The input current value $I_2$ detected by the current sensor $I_2$ and the input voltage value $V_2$ detected by the voltage sensor $V_2$ are transmitted to the controller 40 with the use of adequate signal lines.

The controller 40 controls the operation of the electric power conversion unit 20 based on $I_1$, $V_1$, $I_2$, $V_2$, $V_O$, transmitted via the signal lines, and the command signal, that is, the series mode-parallel mode signal 14. $I_1$, $V_1$, $I_2$, $V_2$, $V_O$ indicate the input current values and output current values of the first battery 28 and second battery 30 and the output voltage value to the load 12, so these are referred to as input-output data of the electric power conversion unit 20. The controller 40 may be formed of a computer suitable for installation on a vehicle.

The controller 40 includes a control signal setting unit 44 that sets control signals to be supplied to the gate terminals of the switching elements S1 to S4. The controller 40 further includes an element identification unit 46, a maximum loss determination unit 48 and a phase control unit 50. The element identification unit 46 identifies a target switching element, of which the temperature is suppressed, from among the switching elements S1 to S4. The maximum loss determination unit 48 determines a state having a maximum loss value in the electric power conversion unit 20 in correspondence with the input-output data. The phase control unit 50 executes phase control for suppressing the maximum loss value. The details of these functions will be described later. These functions may be implemented by software. Specifically, the above functions may be implemented by the controller 40 that executes a loss reduction phase control program. Part of these functions may be implemented by hardware.

A storage unit 42 connected to the controller 40 has the function of storing programs, data, and the like, that are used in the controller 40. Particularly, in order to execute the function of the maximum loss determination unit 48, the storage unit 42 stores a loss state file 52 in which a rising loss value P1 and falling loss value P2 of a PWM signal of the first converter circuit 32 and a rising loss value P3 and falling loss value P4 of a PWM signal of the second converter circuit 34 are associated with the input-output data. In addition, the storage unit 42 stores a delay time file 54 including a delay time Td that should be considered at the time when the phase control unit 50 sets a phase difference. The storage unit 42 may be part of the functions of the controller 40.

A loss in the electric power conversion unit 20 includes a loss, or the like, in a resistance component resulting from currents flowing through the switching elements S1 to S4; however, the largest loss component is a loss at the time of on-off switching in each of the switching elements S1 to S4. The loss state file 52 is associated with a loss at the time of on-off switching in each of the switching elements S1 to S4, so the loss state file 52 may be regarded as the one that substantially indicates a loss state of the electric power conversion unit 20. Hereinafter, unless otherwise specified, a loss means a loss at the time of on-off switching in each of the switching elements S1 to S4.

Figure 2A:
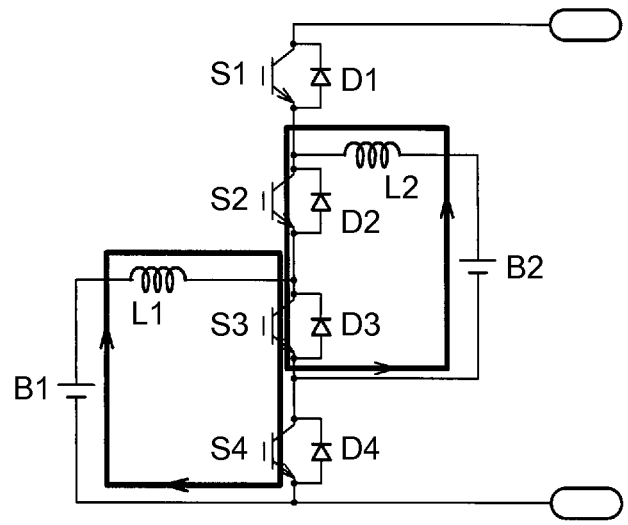
FIG. 2A is a view that shows the flow of current in a series mode in the electric power converter shown in FIG. 1, and is a view that shows the flow of current at the time when electromagnetic energy is stored in two reactors.

The operation of the above configuration, particularly, the functions of the controller 40, will be described in detail with reference to FIG. 2A, FIG. 2B, and the following drawings. FIG. 2A to FIG. 4B show the series mode and parallel mode of electric power conversion in the configuration shown in FIG. 1. These are extracted views of a portion that constitutes the first converter circuit 32 and the second converter circuit 34 in FIG. 1.

Figure 2B:
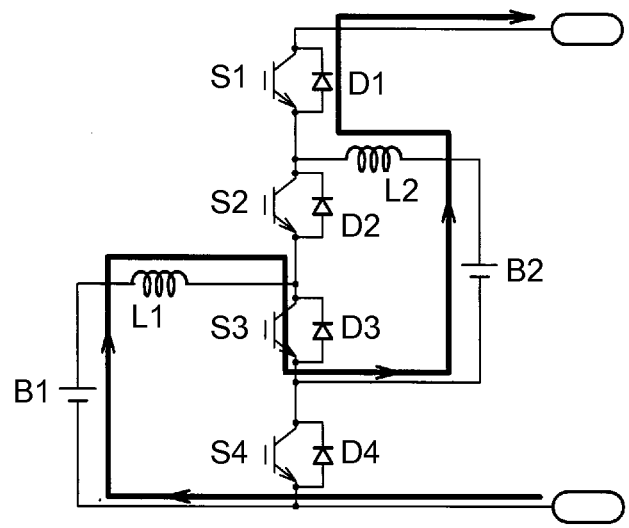
FIG. 2B is a view that shows the flow of current in the series mode in the electric power converter shown in FIG. 1, and is a view that shows the flow of current at the time when stored electromagnetic energy is released.

FIG. 2A and FIG. 2B are views that show the flow of current in the series mode in the electric power conversion unit 20 shown in FIG. 1. FIG. 2A is a view that shows the flow of current at the time when electromagnetic energy is stored in the two reactors, that is, the first reactor L1 and the second reactor L2. FIG. 2B is a view that shows the flow of current at the time when stored electromagnetic energy is released.

In step-up operation in the series mode, initially, the switching element S1 is turned off and the switching elements S3, S4 are turned on to cause current to flow from the first battery B1 to the first reactor L1. At the same time, the switching elements S2, S3 are turned on to cause current to flow from the second battery B2 to the second reactor L2. FIG. 2A is a view that shows the flow of current at the time when electromagnetic energy is stored in the two reactors, that is, the first reactor L1 and the second reactor L2, and the first reactor L1 and the second reactor L2 are excited as a result of the flow of current.

Subsequently, by turning off the switching elements S1, S2, S4 and turning on the switching element S3, electromagnetic energy stored in the first reactor L1 and the second reactor L2 is output through the first battery B1, the first reactor L1, the switching element S3, the second battery B2, the second reactor L2 and the diode D1. FIG. 2B is a view that shows the flow of current at the time when electromagnetic energy stored in the two reactors, that is, the first reactor L1 and the second reactor L2, is released as a result of the output of stored electromagnetic energy to become an output current.

Figure 3A:
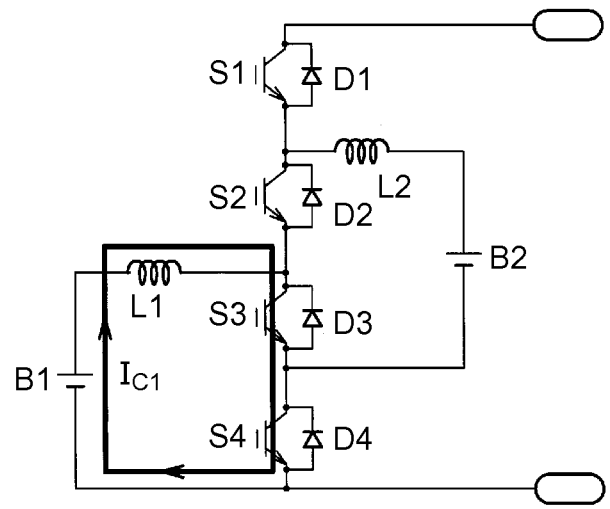
FIG. 3A is a view that shows the flow of current of a first battery in a parallel mode in the electric power converter shown in FIG. 1, and is a view that shows the flow of current at the time when electromagnetic energy is stored in the reactor.
Figure 3B:
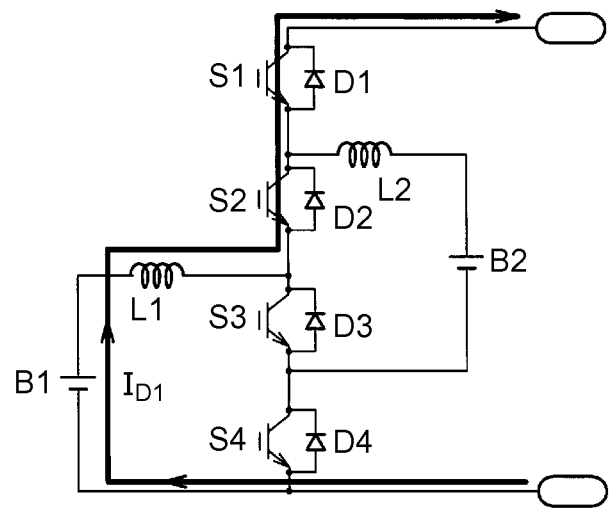
FIG. 3B is a view that shows the flow of current of the first battery in the parallel mode in the electric power converter shown in FIG. 1, and is a view that shows the flow of current at the time when stored electromagnetic energy is released.
Figure 4A:
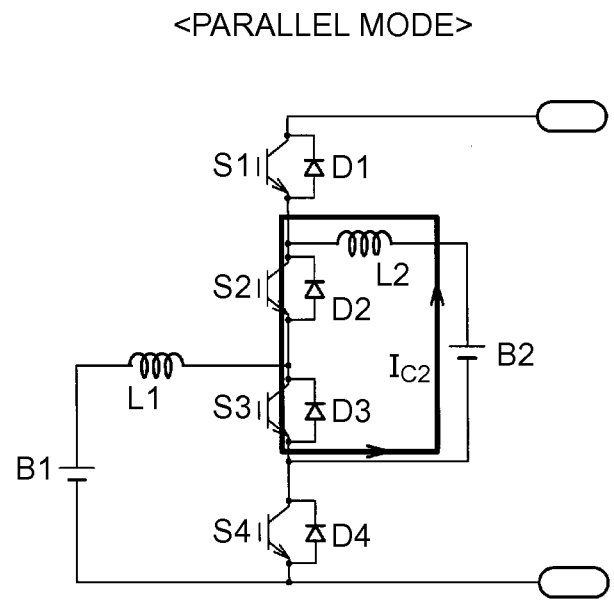
FIG. 4A is a view that shows the flow of current of a second battery in the parallel mode in the electric power converter shown in FIG. 1, and is a view that shows the flow of current at the time when electromagnetic energy is stored in the reactor.
Figure 4B:
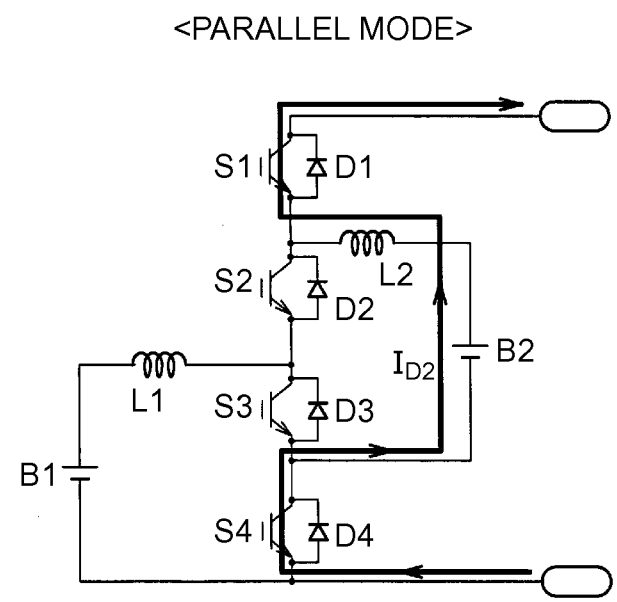
FIG. 4B is a view that shows the flow of current of the second battery in the parallel mode in the electric power converter shown in FIG. 1, and is a view that shows the flow of current at the time when stored electromagnetic energy is released.

FIG. 3A to FIG. 4B are views that show the flow of current in the parallel mode in the electric power conversion unit 20 shown in FIG. 1. FIG. 3A and FIG. 3B show the flow of current associated with the first battery B1. FIG. 4A and FIG. 4B show the flow of current associated with the second battery B2. FIG. 3A and FIG. 4A are views that show the flow of current at the time when electromagnetic energy is stored in the corresponding reactor. FIG. 3B and FIG. 4B are views that show the flow of current at the time when stored electromagnetic energy is released.

In step-up operation in the parallel mode, step-up operation for the first battery B1 and step-up operation for the second battery B2 are independent of each other.

For the first battery B1, initially, the switching elements S1, S2 are turned off and the switching elements S3, S4 are turned on to cause current to flow from the first battery B1 to the first reactor L1. FIG. 3A is a view that shows the flow of a current value $I_{C1}$ at the time when electromagnetic energy is stored in the first reactor L1 and the first reactor L1 is excited as a result of the flow of current.

Subsequently, by turning off all the switching elements S3, S4 and turning on the switching elements S1, S2, electromagnetic energy stored in the first reactor L1 is output through the first battery B1, the first reactor L1 and the switching elements S2, S1. FIG. 3B is a view that shows the flow of a current value $I_{D1}$ at the time when electromagnetic energy stored in the first reactor L1 is released as a result of the output of stored electromagnetic energy to become an output current.

For the second battery B2, initially, the switching elements S1, S4 are turned off and the switching elements S2 S3 to cause current to flow from the second battery B2 to the first reactor L1. FIG. 4A is a view that shows the flow of a current value $I_{C2}$ at the time when electromagnetic energy is stored in the second reactor L2 and the second reactor L2 is excited as a result of the flow of current.

Subsequently, by turning off the switching elements S2, S3 and turning on the switching elements S4, S1, electromagnetic energy stored in the second reactor L2 is output through the switching element S4, the second battery B2, the second reactor L2 and the switching element S1. FIG. 4B is a view that shows the flow of a current value $I_{D2}$ at the time when electromagnetic energy stored in the second reactor L2 is released as a result of the output of electromagnetic energy to become an output current.

Hereinafter, step-up operation in the parallel mode in the electric power conversion unit 20 will be described. In the electric power conversion unit 20, switching operations of the switching elements S1 to S4 in FIG. 3A, FIG. 3B, FIG. 4A and FIG. 4B are carried out through PWM control over the first converter circuit 32 and PWM control over the second converter circuit 34. In PWM control, a first duty ratio DR1 of the first converter circuit 32 and a second duty ratio DR2 of the second converter circuit 34 are determined such that the output voltage value $V_O$ required to operate the load 12 is satisfied, and on-off control signals of the switching elements S1 to S4 are set based on the first duty ratio DR1 and the second duty ratio DR2. The resultant output voltage value $V_O$ is fed back, and proportional control or proportional plus derivative control is executed such that the output voltage value becomes desired $V_O$.

Where a PWM signal in PWM control over the first converter circuit 32 is a first PWM signal (PWM1), the first duty ratio DR1 of the first converter circuit 32 is the ratio of a period during which PWM1 is in an ON state to one period of PWM1. (1-DR1) is the ratio of a period during which PWM1 is in an OFF state to one period of PWM1. (1-DR1) is the ratio of a period during which /PWM1, which is an inversion signal of the first PWM signal, to one period of /PWM1. As the first duty ratio DR1 increases, a step-up ratio of the first converter circuit 32 increases. The same applies to the second converter circuit 34.

When described with reference to FIG. 3A and FIG. 3B, the total of a period of FIG. 3A and a period of FIG. 3B is one period of PWM1, the ratio of the period of FIG. 3A to the one period is DR1, and the ratio of the period of FIG. 3B to the one period is (1-DR1). Therefore, in the first converter circuit 32, the switching elements S3, S4 are turned on during the period of DR1, and the switching elements S1, S2 are turned on during the period of (1-DR1).

Similarly, when described with reference to FIG. 4A and FIG. 4B, the total of a period of FIG. 4A and a period of FIG. 4B is one period of PWM2, the ratio of the period of FIG. 4A to the one period is DR2, and the ratio of the period of FIG. 4B to the one period is (1-DR2). Therefore, in the second converter circuit 34, the switching elements S2, S3 are turned on during the period of DR2, and the switching elements S1, S4 are turned on during the period of (1-DR2).

FIG. 5 is a table that summarizes these operations. In FIG. 5, the abscissa axis shows the switching elements S1 to S4, the ordinate axis shows the relationships between DR1, (1-DR1), DR2, (1-DR2) and the on state of each switching element. When the results of FIG. 5 are expressed by logical expressions as shown in FIG. 6. In FIG. 6, the ordinate axis shows the switching elements S1 to S4, and fields in the abscissa axis direction show the relationship between each switching element and a logical expression based on which the switching element is turned on. For example, as shown in FIG. 5, the switching element S1 is turned on during the period of (1-DR1) in the first converter circuit 32 or during the period of (1-DR2) in the second converter circuit 34. The period of (1-DR1) in the first converter circuit 32 is a period during which /PWM1 is in an ON state. The period of (1-DR2) in the second converter circuit 34 is a period during which /PWM2 is in an ON state. Where a logical value at the time when the signal is in the ON state is 1, a condition that the switching element S1 turns on is expressed by the logical expression [(/PWM1) OR (/PWM2)].

Similarly, a condition that the switching element S2 turns on is expressed by the logical expression [(/PWM1) OR (PWM2)]. A condition that the switching element S3 turns on is expressed by the logical expression [(PWM1) OR (PWM2)]. A condition that the switching element S4 turns on is expressed by the logical expression [(PWM1) OR (/PWM2)].

Where PWM1 or /PWM1 is referred to as first signal and PWM2 or /PWM2 is referred to as second signal, a logical expression that shows a condition that the switching elements S1 to S4 turn on may be expressed by [(first signal) OR (second signal)].

As shown in FIG. 6, in the parallel mode of the electric power converter 10, the ON-OFF state of each of the plurality of switching elements S1 to S4 is determined based on a combination of the first signal, which is the first PWM signal or the inversion signal of the first PWM signal, and the second signal, which is the second PWM signal or the inversion signal of the second PWM signal. The output voltage value and output current value of the electric power converter 10 depend on the first duty ratio of the first signal and the second duty ratio of the second signal, so the output voltage value and output current value of the electric power converter 10 remain unchanged even when a phase difference of the second signal with respect to the first signal is changed. By appropriately setting the phase difference between the first signal and the second signal by the use of this characteristic of the parallel mode, it is possible to bring the ON-OFF state of the first signal and the ON-OFF state of the second signal into coincidence with the ON-OFF states of the plurality of switching elements S1 to S4 or make the ON-OFF state of the first signal and the ON-OFF state of the second signal different from the ON-OFF states of the plurality of switching elements S1 to S4 while the output characteristic of the electric power converter 10 remains unchanged.

Thus, by appropriately setting the phase difference between the first signal and the second signal, it is possible to suppress the number of on-off switching operations of the plurality of switching elements S1 to S4 while the output characteristic of the electric power converter 10 remains unchanged. It is possible to suppress the number of on-off switching operations of a specific switching element by appropriately setting the phase difference between the corresponding first signal and the corresponding second signal that define the ON-OFF states of the specific switching element. Therefore, for example, it is possible to set a switching element having a large amount of heat generation for the specific switching element and suppress the number of switching times of the switching element having a large amount of heat generation. In this case, if it is determined which signal switching produces the largest switching loss among the rising edges and falling edges of the first signal and second signal that define the ON-OFF states of the specific switching element, it is possible not to cause the specific switching element to turn on or off at the timing of the signal switching that produces the largest switching loss. Thus, it is possible to suppress the switching loss of the specific switching element of which generation of heat is intended to be suppressed and to suppress the number of actual switching operations. Hereinafter, an example, or the like, thereof will be described.

Figure 7:
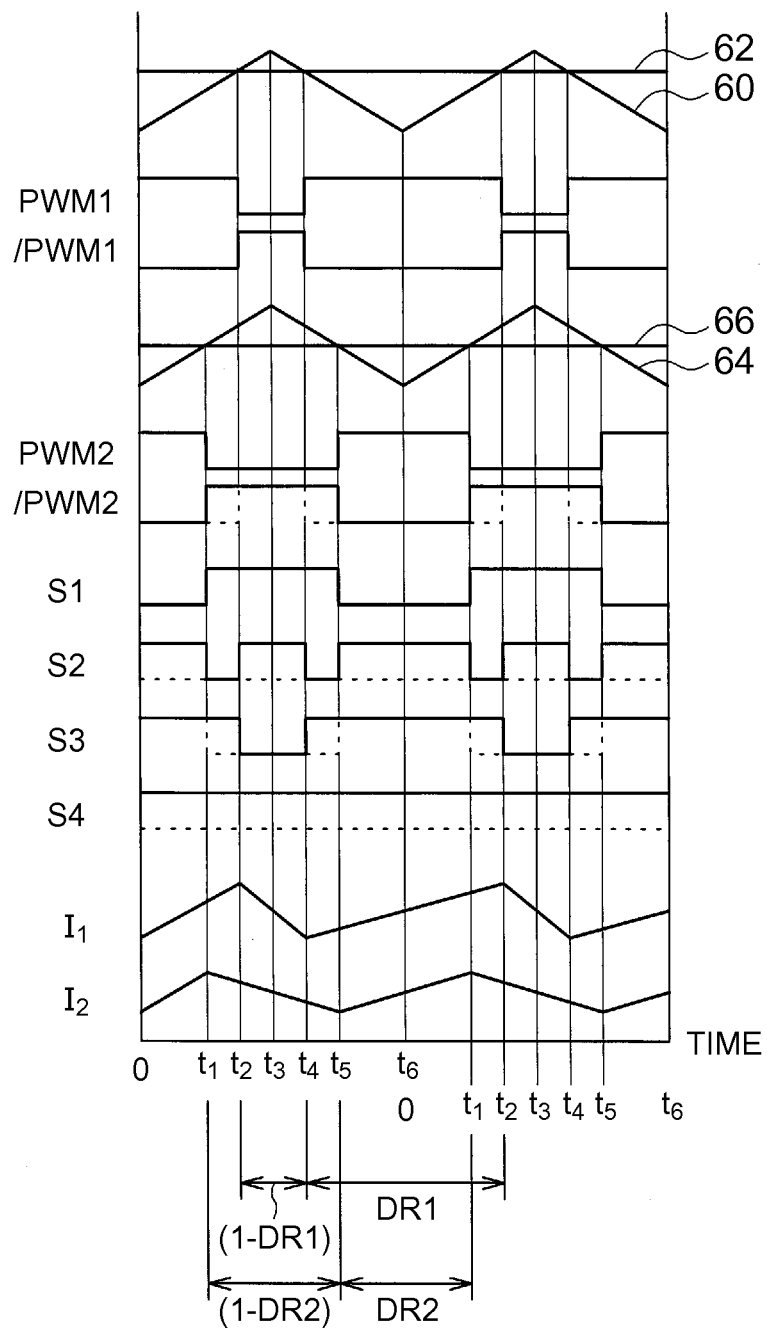
FIG. 7 is a time chart that shows temporal variations in the operation of each of the switching elements, and the like, at the time when a first duty ratio DR1 of a first PWM signal (PWM1) for a first converter circuit and a second duty ratio DR2 of a second PWM signal (PWM2) for a second converter circuit are applied in the electric power converter according to the embodiment of the invention where the abscissa axis represents time.

FIG. 7 is a time chart that shows temporal variations in the states of elements at the time when the step-up operation in the parallel mode of the electric power conversion unit 20 is executed through PWM control of the controller 40. In FIG. 7, the abscissa axis represents time and shows a time of two periods in PWM control. The ordinate axis represents a state of each element. In a rectangular waveform, a high level indicates an ON state and the logical value is 1, and a low level indicates an OFF state and the logical value is 0.

The uppermost graph in the ordinate axis shows a state of a carrier signal 60 of PWM control in the first converter circuit 32 and a state of a reference signal 62 that determines the first duty ratio DR1. The second graph from the uppermost graph shows states of PWM1 and /PWM1 that are the first signals. The third graph indicates a state of a carrier signal 64 of PWM control in the second converter circuit 34 and a state of a reference signal 66 that determines the second duty ratio DR2. The period and amplitude of the carrier signal 64 in the second converter circuit 34 are the same as the period and amplitude of the carrier signal 60 in the first converter circuit 32, and the phase difference between the carrier signals 60, 64 is 0. The fourth graph shows states of PWM2 and /PWM2 that are the second signals. The fifth graph to the eighth graph respectively show the states of the switching elements S1 to S4. As described with reference to FIG. 6, the ON state of each switching element is the OR of the logical value of the first signal and the logical value of the second signal, so, when the period in which the first signal or the second signal is in the ON state is long, the switching element does not turn on or off at the on-off timing of the first signal or the second signal, having a shorter on period. The ON-OFF state that does not appear is indicated by the dashed line. In this way, the ON-OFF state of the first signal and the ON-OFF state of the second signal may coincide with the ON-OFF state of a corresponding one of the switching elements or may be different from the ON-OFF state of a corresponding one of the switching elements. The ninth graph indicates a state of $I_1$ of the first converter circuit 32. The tenth graph indicates a state of $I_2$ of the second converter circuit 34. $I_1$ is composed of the $I_{C1}$ component and the $I_{D1}$ component described with reference to FIG. 3A and FIG. 3B. $I_2$ is composed of the $I_{C2}$ component and the $I_{D2}$ component described with reference to FIG. 4A and FIG. 4B.

The abscissa axis represents time $t_1$ to time $t_6$ at which a state change indicated by the ordinate axis occurs where $t=0$ is set for the origin of one period of PWM control. The period from time $t_4$ in the first period to time $t_2$ in the second period corresponds to DR1, and the period from time $t_2$ to time $t_4$ in each period corresponds to (1-DR1). The period from time $t_5$ in the first period to time $t_1$ in the second period corresponds to DR2, and the period from time $t_1$ to time $t_5$ in each period corresponds to (1-DR2). Time $t_6$ is the time of termination of each period. Time $t=t_6$ and time $t=t_3$ correspond to reference positions of the phases of the carrier signals 60, 64.

Even when a phase difference is provided between the carrier signals 60, 64, the first duty ratio DR1 or the second duty ratio DR2 does not change, so the average value of $I_1$ and the average value of $I_2$ in one period of PWM control are the same and do not change. Therefore, even when phase control for providing a phase difference between the carrier signals 60, 64 is executed, a current value that is supplied to the load 12 does not change. The phase difference between the carrier signals 60, 64 is a phase difference between the first signal and the second signal. Therefore, even when a phase difference is provided between the first signal and the second signal, the output characteristic of the electric power converter 10 to the load 12 does not change.

Figure 8:
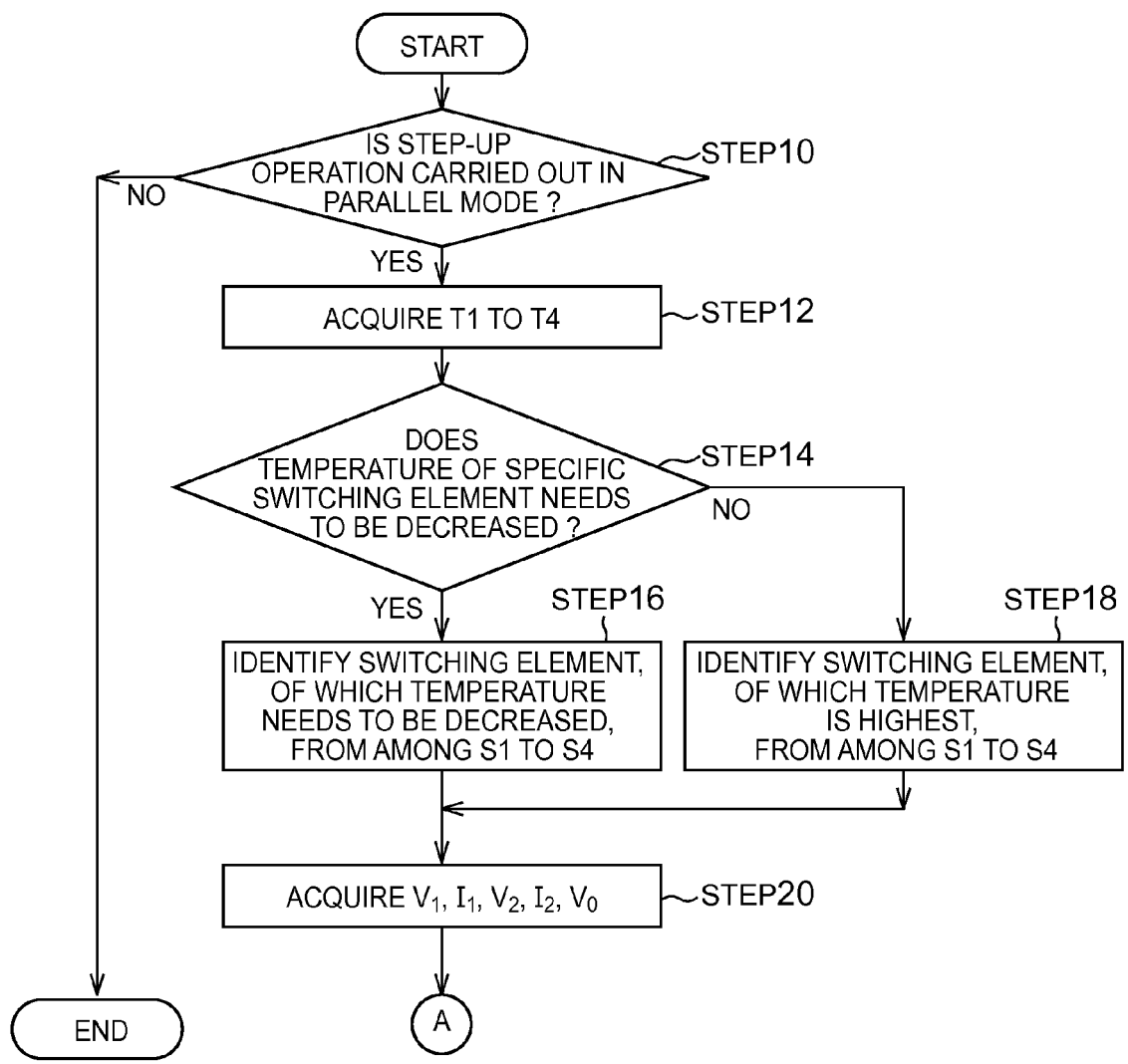
FIG. 8 is a first half of a flowchart that shows the steps of executing phase control in the electric power converter according to the embodiment of the invention.
Figure 9:
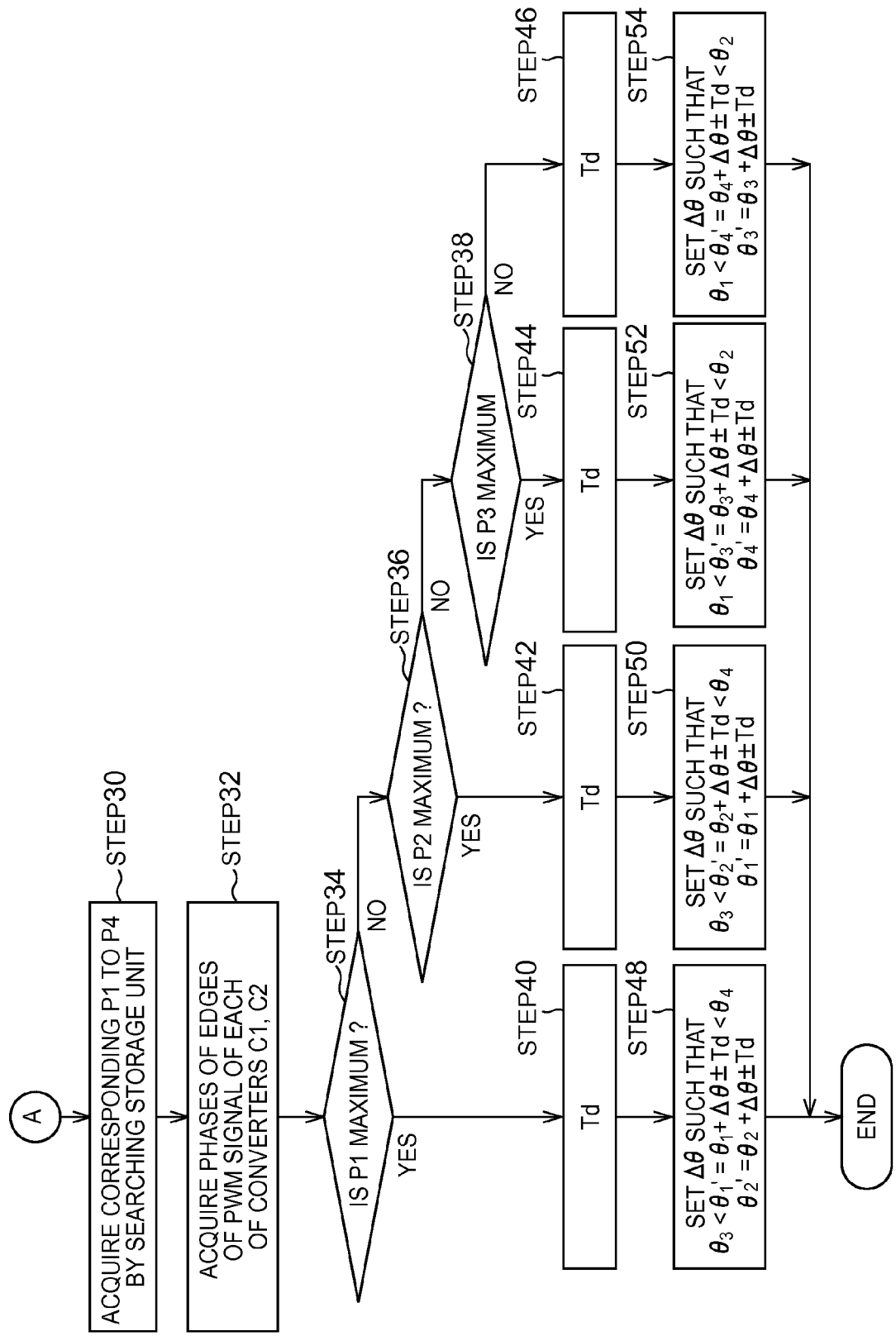
FIG. 9 is a second half of the flowchart subsequent to FIG. 8.

Next, phase control for causing the rising or falling timing at which a switching loss is maximum not to appear as the on-off timing of any one of the switching elements by the use of the characteristic of logical OR by providing a phase difference between the carrier signal 60 of the first converter circuit 32 and the carrier signal 64 of the second converter circuit 34 will be described with reference to FIG. 8 to FIG. 14B. FIG. 8 and FIG. 9 are flowcharts that separately show the first half portion and second half portion of the steps of phase control. The steps correspond to processing steps of the loss reduction phase control program that is executed by the controller 40. FIG. 10 to FIG. 14B are views that illustrate the details of the steps of phase control.

For example, when an ignition switch is turned on in the vehicle, electronic devices of the vehicle are initialized. In FIG. 1, the elements of the electric power converter 10 are initialized, and the controller 40 is also initialized. When predetermined initialization completes, the loss reduction phase control program is launched in the controller 40. In FIG. 8, initially, it is determined whether a control mode of step-up control is the parallel mode (STEP10). When the details of the series-parallel control command signal do not indicate to execute step-up operation in the parallel mode, negative determination is made in STEP10, the process does not proceed to the following step, and the process ends. When the details of the series-parallel control command signal indicate to execute step-up operation in the parallel mode, affirmative determination is made in STEP10.

When affirmative determination is made in STEP10, on-off control signals of the switching elements S1 to S4 are set in order to execute step-up control in the parallel mode. This processing step is executed as follows by the function of the control signal setting unit 44 of the controller 40.

Step-up control in the parallel mode is executed in accordance with the following steps through PWM control over the first converter circuit 32 and PWM control over the second converter circuit 34.

Because the command signal, that is, the series mode-parallel mode signal 14, also includes the output voltage value $V_O$, the output current value $I_O$, and the like, required of the load 12, the first duty ratio DR1 for the first converter circuit 32 and the second duty ratio DR2 for the second converter circuit 34 are calculated based on the output voltage value $V_O$, the output current value $I_O$, and the like.

The reference signal 62 for PWM control over the first converter circuit 32 is set based on the calculated first duty ratio DR1. The reference signal 66 for PWM control over the second converter circuit 34 is set based on the calculated second duty ratio DR2. From these reference signals 62, 66 and the carrier signals 60, 64, as shown in FIG. 7, the first PWM signal (PWM1) and the inversion signal (/PWM1) of the first PWM signal are generated, and the second PWM signal (PWM2) and the inversion signal (/PWM2) of the second PWM signal are generated.

Because the first PWM signal (PWM1) or the inversion signal (/PWM1) of the first PWM signal is the first signal and the second PWM signal (PWM2) or the inversion signal (/PWM2) of the second PWM signal is the second signal, as described with reference to FIG. 6, the on-off control signals of the switching elements are set by applying the logical expression [(first signal is on) OR (second signal is on)]= [switching element is on] to each of the switching elements. In this way, the on-off control signals of the switching elements S1 to S4 are set. The set on-off control signals of the switching elements are shown in FIG. 7.

Subsequently, the element temperatures $T_1$ to $T_4$ of the switching elements S1 to S4 are acquired (STEP12). The controller 40 acquires the element temperatures $T_1$ to $T_4$ by acquiring values detected by the temperature sensors $T_1$ to $T_4$ via the corresponding signal lines. The acquired element temperatures $T_1$ to $T_4$ each are compared with a predetermined element temperature threshold, and then it is determined based on the results of the comparison whether the temperature of any specific switching element needs to be reduced (STEP14). The element temperature threshold may be determined based on, for example, the specifications of the usage temperature of each switching element. When affirmative determination is made, the switching element of which the temperature needs to be reduced is identified based on the determined result (STEP16). When there are two or more switching elements of which the temperature needs to be reduced, the switching element of which the temperature exceeding the element temperature threshold is the highest is identified. When negative determination is made in STEP14, it is presumable that protection from the viewpoint of the element temperature threshold is sufficient; however, the switching element of which the element temperature is the highest is identified from the viewpoint of reducing the loss of the electric power conversion unit 20 (STEP18). These processing steps are executed by the function of the element identification unit 46 of the controller 40.

Subsequently, current input-output data of the operating electric power conversion unit 20 are acquired (STEP20). The input-output data are five data, that is, the input current values $I_1$, $I_2$ that are detected by the current sensors $I_1$, $I_2$, the input voltage values $V_1$, $V_2$ that are detected by the voltage sensors $V_1$, $V_2$, and the output voltage value $V_O$ that is detected by the voltage sensor $V_O$. A switching loss (described later) is calculated based on these data.

Figure 10:
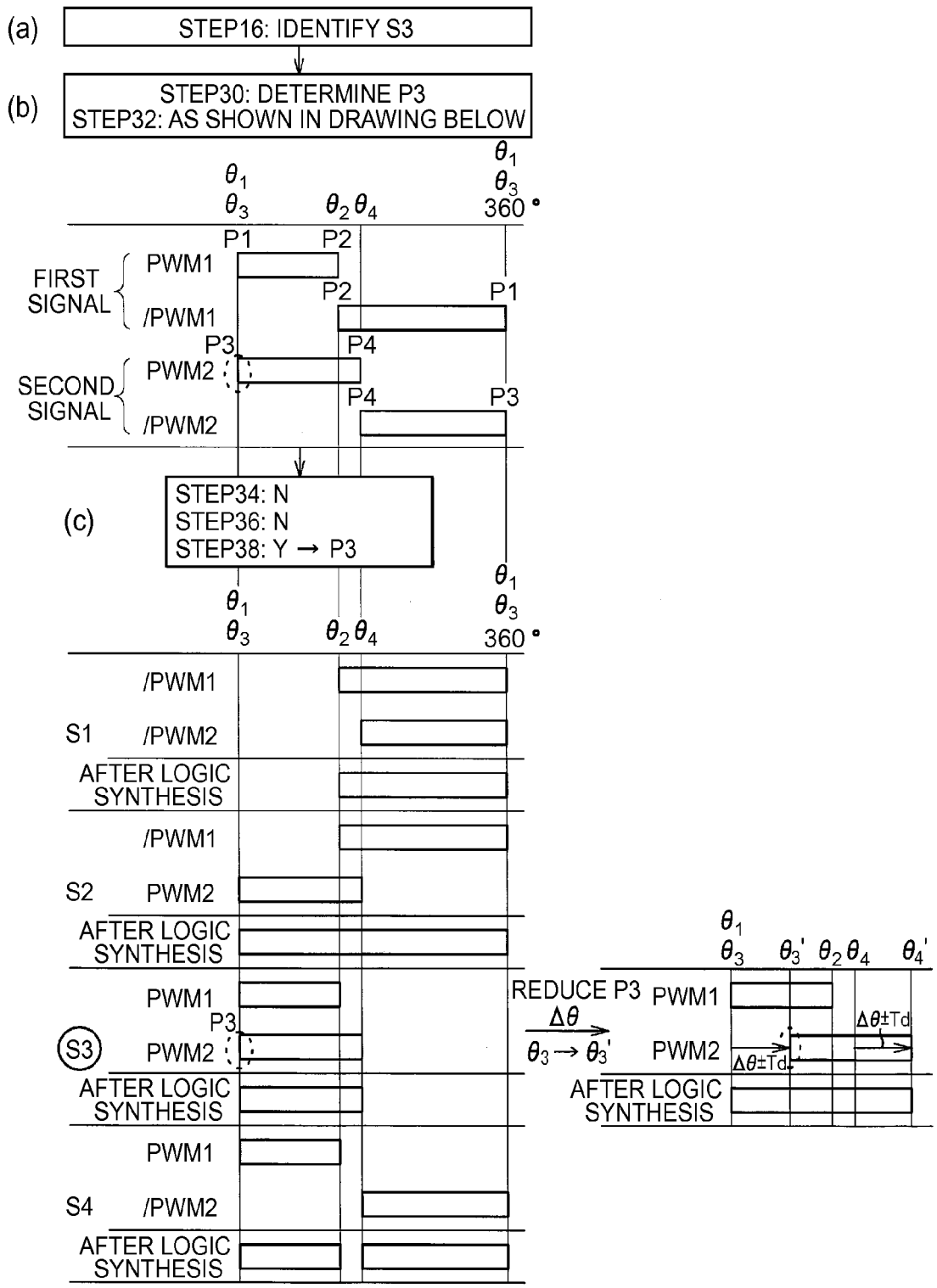
FIG. 10 is a view that shows one specific example of the details shown in FIG. 8 and FIG. 9.

The first half steps are up here, and are shown in FIG. 8. The second half steps shown in FIG. 9 are the following. The details of the steps shown in FIG. 9 will be described with reference to specific examples. FIG. 10 to FIG. 11E are views that show the details of the steps shown in FIG. 9 at the time when the switching element S3 is identified in FIG. 8.

In FIG. 9, in the step that is executed subsequently to acquisition of input-output data in STEP20 of FIG. 8, the loss state file 52 in the storage unit 42 is searched by the use of the acquired input-output data, and the magnitudes of four loss states corresponding to the input-output data are acquired. The four loss states are the rising loss value P1 and falling loss value P2 of the PWM signal of the first converter circuit 32 and the rising loss value P3 and falling loss value P4 of the PWM signal of the second converter circuit 34 (STEP30). A state having a maximum loss value among the four loss states is determined from among P1 to P4. These processing steps are executed by the maximum loss determination unit 48 of the controller 40.

The phases of the edges of the PWM signal of each of the first converter circuit 32 and the second converter circuit 34 are acquired (STEP32). The phases of the edges of the PWM signal of the first converter circuit 32 are a phase $\theta_1$ at the rising edge of PWM1 and a phase $\theta_2$ at the falling edge of PWM1. The phase $\theta_1$ at the rising edge of PWM1 is a phase at which P1 arises, and the phase $\theta_2$ at the falling edge of PWM1 is a phase at which P2 arises. The phases indicate the positions of rising and falling edges by angle where one period of PWM control is 360 degrees. Because PWM1 and /PWM1 have an inversion relation with each other, the phase $\theta_1$ of the rising edge of PWM1 is the same as the phase of the falling edge of /PWM1, and the phase $\theta_2$ of the falling edge of PWM1 is the same as the phase of the rising edge of /PWM1. Hereinafter, the rising edge and falling edge of the PWM signal in the first converter circuit 32 are represented by the rising edge and falling edge of PWM1.

Similarly, the phases of the edges of the PWM signal of the second converter circuit 34 are a phase $\theta_3$ at the rising edge of PWM2 and a phase $\theta_4$ at the falling edge of PWM2. The phase $\theta_3$ of the rising edge of PWM2 is a phase at which P3 arises, and the phase $\theta_4$ of the falling edge of PWM2 is a phase at which P4 arises.

In FIG. 9, the processing step of S32 is executed subsequently to the processing step of S30; instead, S30 and S32 may be executed in parallel at the same time. Alternatively, the processing step of S32 may be executed in advance of the processing step of S30.

The processing steps up here will be described with reference to FIG. 10 by way of a specific example. FIG. 10(a) shows that the switching element S3 is identified in STEP16 as a target of which the temperature is suppressed. FIG. 10(b) is a view that shows that a state having the maximum loss value is determined as P3 in STEP30 together with the results of STEP30 and STEP32.

In the bottom chart in FIG. 10(b), the abscissa axis represents phase, and the ordinate axis represents the type of the PWM signal. The phase ranges from 0 degrees, which is the start timing of one period of PWM control, to 360 degrees, which is the end timing. The PWM signal includes four types, that is, PWM1, /PWM1, PWM2, /PWM2. Each rectangular box represents a phase range in which a corresponding one of the PWM signals is in an ON state and the logical value is 1.

In FIG. 10(b), the phase range of the rectangular box of PWM1 is a phase range at the time when PWM1=1. Therefore, the ratio of the phase range of the rectangular box to one period of PWM1, that is, 360 degrees, is the first duty ratio DR1 for the first converter circuit 32, and the ratio of the phase range of the rectangular box to one period of /PWM1, that is, 360 degrees, is (1-DR1) for the first converter circuit 32. Similarly, the phase range of the rectangular box of PWM2 is a phase range in which PWM2=1. Therefore, the ratio of the phase range of the rectangular box to one period of PWM2, that is, 360 degrees, is the second duty ratio DR2 for the second converter circuit 34, and the ratio of the phase range of the rectangular box to one period of /PWM2, that is, 360 degrees, is (1-DR2) for the second converter circuit 34.

In the example of FIG. 10(b), DR2 is larger than DR1, and the phase range of the rectangular box of PWM2 is wider than the phase range of the rectangular box of PWM1. As shown in FIG. 7, when the phase difference between the carrier signal 60 of the first converter circuit 32 and the carrier signal 64 of the second converter circuit 34 is 0 degrees, the phase range of the rectangular box of PWM1 is included in the phase range of the rectangular box of PWM2.

In PWM control over the electric power conversion unit 20, even when the phase difference between the carrier signal 60 of the first converter circuit 32 and the carrier signal 64 of the second converter circuit 34 is changed from 0 degrees, but when the first duty ratio DR1 and the second duty ratio DR2 are the same, the output voltage value or output current value of the electric power conversion unit 20 does not change. When the phase difference between the carrier signal 60 and the carrier signal 64 is changed from 0 degrees, it is possible to reduce the number of switching times the switching element turns on or off. For example, in FIG. 7, when the phase difference between the carrier signal 60 and the carrier signal 64 is changed from 0 degrees to bring the rising timing of PWM1 and the rising timing of PWM2 into coincidence with each other, the number of switching times of the switching element S2 reduces once per one period. In this way, by changing the phase difference between the carrier signal 60 and the carrier signal 64, the number of switching times of the switching element S2 is reduced without changing the output voltage value or output current value of the electric power conversion unit 20. Thus, it is possible to reduce a switching loss.

When the phase difference between the carrier signal 60 and the carrier signal 64 is not 0 degrees, the phase range of the rectangular box of PWM2 and the phase range of the rectangular box of PWM1 may partially overlap with each other or may partially extend off or may not overlap with each other at all. The rising edge in the phase range of the rectangular box of PWM2 may have the same phase as the rising or falling edge in the phase range of the rectangular box of PWM1.

In the specific example described with reference to FIG. 10, it is assumed that, in an initial state, the rising edge in the phase range of the rectangular box of PWM1 and the rising edge of the phase range of the rectangular box of PWM2 coincide with each other and the phase of the coincidence is the start timing of one period of the PWM signal of the first converter circuit 32 and is also the start timing of one period of the PWM signal of the second converter circuit 34. At this time, the results of the processes of STEP30 and STEP32 are that, as shown in FIG. 10(b), $\theta_1=\theta_3$ at the time when the phase is 0 degrees or 360 degrees, the loss value of PWM1 is P1 and the loss value of PWM2 is P3 at that time. The loss value of PWM1 at the phase $\theta_2$ is P2, and the loss value of PWM2 at the phase $\theta_4$ is P4.

Referring back to FIG. 9, in STEP30, the process proceeds to STEP34 when the determined maximum loss value is P1, the process proceeds to STEP36 when the determined maximum loss value is P2, the process proceeds to STEP38 when the determined maximum loss value is P3, and the process proceeds to STEP46 when the determined maximum loss value is P4.

As shown in FIG. 10(c), in the specific example, negative determination is made in STEP34, negative determination is made in STEP36 and affirmative determination is made in STEP38, that is, the determined maximum loss value is P3. Because the current state of the PWM signal is as shown in FIG. 10(b), it is possible to obtain the current states of the first signal and second signal in S1 to S4 and a state after a logic synthesis of {(first signal) OR (second signal)} by using a list of the logical expressions shown in FIG. 6. The results are shown at the bottom of FIG. 10(c). The state after a logic synthesis of {(first signal) OR (second signal)} indicates a phase range in which the corresponding switching element is in the ON state.

For example, in the S1, as shown in FIG. 6, the first signal is /PWM1 and the phase range in which /PWM1 is in the ON state is from $\theta_2$ to (360 degrees=) $\theta_1$, and the second signal is /PWM2 and the phase range in which /PWM2 is in the ON state is from $\theta_4$ to $\theta_3$. The phase range after the logic synthesis is from $\theta_2$ to $\theta_3$ (=$\theta_1$), and the S1 is in the ON state in this phase range. Similarly, in the S2, as shown in FIG. 6, the first signal is /PWM1 and the phase range in which /PWM1 is in the ON state is from $\theta_2$ to (360 degrees=) $\theta_1$, and the second signal is PWM2 and the phase range in which PWM2 is in the ON state is from $\theta_3$ to $\theta_4$. The phase range after the logic synthesis is from $\theta_3$ to (360 degrees=) $\theta_1$, that is, one entire period, and the S2 is in the ON state in the entire phase range.

In the S3, as shown in FIG. 6, the first signal is PWM1 and the phase range in which PWM1 is in the ON state is from $\theta_1$ to $\theta_2$, and the second signal is PWM2 and the phase range in which PWM2 is in the ON state is from $\theta_3$ to $\theta_4$. The phase range after the logic synthesis begins from $\theta_1$ (=$\theta_3$) and ends at $\theta_4$, and the S3 is in the ON state in this phase range. Similarly, in the S4, as shown in FIG. 6, the first signal is PWM1 and the phase range in which PWM1 is in the ON state is from $\theta_1$ to $\theta_2$, and the second signal is /PWM2 and the phase range in which /PWM2 is in the ON state is from $\theta_4$ to (360 degrees=) $\theta_3$. The phase range after the logic synthesis includes a range that begins from $\theta_1$ and ends at $\theta_2$ and a range that begins from $\theta_4$ and ends at (360 degrees=) $\theta_3$, and the S3 is in the ON state in this phase range.

The temperature suppressing target is identified as the S3 in FIG. 10(a), and the state having the maximum loss value is determined as P3 in FIG. 10(b), so the S3 is circled in FIG. 10(c), and the phase at which P3 arises is surrounded by the dashed line circle. The controller 40 executes phase control such that the rising edge of PWM2, which is surrounded by the dashed line circle, does not overlap with actual on-off switching of the S3. Thus, the temperature of the S3 is suppressed. For this purpose, the controller 40 just needs to execute phase control for shifting the phase of PWM2 with respect to the phase of PWM1 such that the phase $\theta_3$ of the rising edge of PWM2 does not coincide with the rising edge or the falling edge but is included in the phase range in which the S3 is in the ON state after the logic synthesis of the S3, which indicates the ON state of the S3 in actual on-off switching.

In the case of FIG. 10(c), the phase of the second signal is shifted with respect to the phase of the first signal such that the phase $\theta_3$ of the rising edge of PWM2 that is the second signal falls between $\theta_1$ and $\theta_2$ in the phase range of $\theta_1$ to $\theta_2$, in which PWM1 that is the first signal is in the ON state. A phase shift amount $\Delta\theta$ is desirably set such that the phase $\theta_3$ of the rising edge of PWM2 is just in the middle of the phase range $\theta_1$ to $\theta_2$, in which PWM1 that is the first signal is in the ON state; however, at this time, the delay time Td for signal processing is also taken into consideration. The delay time Td includes a delay in response of a photocoupler, a delay in transmission of the signal line, and the like. The data of the delay time Td are stored in advance in the delay time file 54 in the storage unit 42, so Td that is read from the storage unit 42 is used.

Therefore, where the phase of the rising edge of PWM2 after a phase shift by ($\Delta\theta\pm Td$) with respect to the phase $\theta_3$ is $\theta_3'$, $\{\theta_3'=\theta_3+\Delta\theta\pm Td\}$ just needs to fall between $\theta_1$ and $\theta_2$. The right-side view of FIG. 10(*c*) shows a state where $\theta_3$ is shifted in phase to $\theta_3'$ by ($\Delta\theta\pm Td$) in order to reduce P3. $\theta_3'$ falls between $\theta_1$ and $\theta_2$.

FIG. 11A to FIG. 11E and FIG. 12A to FIG. 12F are time charts that show that it is possible to suppress P3 that is the state having the maximum loss value by executing such phase control and views of the flow of current. FIG. 10 is a view that shows the state before phase control is executed. FIG. 11A to FIG. 11E are views that show a case where no phase control is executed at all. FIG. 12A to FIG. 12F are views that show a state after phase control is executed. The case where the switching element S3 is identified as the temperature suppressing target and P3 is determined as the state having the maximum loss value in FIG. 10 will be described.

FIG. 11A to FIG. 11E are views that show the state where no phase control for suppressing the loss is executed. FIG. 11A is a view extracting a portion of the S3 in FIG. 10(*c*) and adding a time chart of the ON-OFF state of the S3 for further easy understanding. The abscissa axis of the time chart represents phase. FIG. 11B shows a time chart for each of the current value $I_{C1}$ at the time when electromagnetic energy is stored in the first reactor L1 in the current value $I_1$ of the first converter circuit 32, the current value $I_{C2}$ at the time when electromagnetic energy is stored in the second reactor L2 in the current value $I_2$ of the second converter circuit 34 and the current value flowing through the switching element S3. The abscissa axis of the time chart also represents phase. FIG. 11C to FIG. 11E are views that show how $I_{C1}$ and $I_{D1}$ that constitute $I_1$ and $I_{C2}$ and $I_{D2}$ that constitute $I_2$ flow at each phase.

Because PWM1 and PMW2 are in the ON state in a section in which the phase is from 0 degrees ($=\theta_1, \theta_3$) to $\theta_2$, electromagnetic energy is stored in the first reactor L1 in the first converter circuit 32, and electromagnetic energy is stored in the second reactor L2 in the second converter circuit 34. Therefore, as shown in FIG. 11C, $I_{C1}$ flows in the state shown in FIG. 3A, and $I_{C2}$ flows in the state shown in FIG. 4A. As shown in FIG. 11B, changes in $I_{C1}$ and $I_{C2}$ are such that, at the phase (0 degrees=$\theta_1, \theta_3$), $I_{C1}$ rises from zero to $I_{C1}$ and $I_{C2}$ rises from zero to $I_{C2}$. Therefore, at a phase of 0 degrees ($=\theta_1, \theta_3$), the current value flowing through the S3 rises from zero to ($I_{C1}+I_{C2}$) at a stroke.

Because PWM1 is in the OFF state and PMW2 is in the ON state in a section in which the phase is from $\theta_2$ to $\theta_4$, electromagnetic energy stored in the first reactor L1 is released in the first converter circuit 32, and electromagnetic energy is continuously stored in the second reactor L2 in the second converter circuit 34. Therefore, as shown in FIG. 11D, $I_{C1}$ flows in the state shown in FIG. 3B, and $I_{C2}$ flows in the state shown in FIG. 4A. As shown in FIG. 11B, changes in $I_{C1}$ and $I_{C2}$ are such that, at the phase $\theta_2$, $I_{C1}$ falls from $I_{C1}$ to zero and $I_{C2}$ remains unchanged. Therefore, current flowing through the S3 falls from ($I_{C1}+I_{C2}$) to $I_{C2}$ at the phase $\theta_2$.

Because PWM1 and PWM2 are in the OFF state in a section in which the phase is from $\theta_4$ to 360 degrees, electromagnetic energy stored in the first reactor L1 is continuously released in the first converter circuit 32, and electromagnetic energy stored in the second reactor L2 is released in the second converter circuit 34. Therefore, as shown in FIG. 11E, $I_{C1}$ flows in the state shown in FIG. 3B, and $I_{C2}$ flows in the state shown in FIG. 4B. As shown in FIG. 11B, changes in $I_{C1}$ and $I_{C2}$ are such that, at the phase $\theta_4$, $I_{C1}$ remains at zero and $I_{C2}$ falls from $I_{C2}$ to zero. Therefore, current flowing through the S3 falls from $I_{C2}$ to zero at the phase $\theta_4$.

When the on-off switching of the S3 is observed in FIG. 11A, the S3 changes from the OFF state to the ON state at the phase (0 degrees=$\theta_1, \theta_3$), and changes from the ON state to the OFF state at the phase $\theta_4$. The S3 does not turn on or off at the phase $\theta_2$. The on-off switching of the second signal at the time when P3 arises is such that the second signal rises from the OFF state to the ON state at the phase (0 degrees=$\theta_1, \theta_3$). That is, at the time of switching of the S3 from the OFF state to the ON state, on-off switching occurs as a result of rising of the second signal, which produces P3 in the state having the maximum loss value.

FIG. 12A to FIG. 12F are views that show phase control for, at the time of switching of the S3 from the OFF state to the ON state described in FIG. 11A to FIG. 11E, eliminating on-off switching due to rising of the second signal at the time when P3 in the state having the maximum loss value arises. FIG. 12A is a view extracting the right-side view of FIG. 10(*c*) and adding a time chart of the ON-OFF state of the S3 for further easy understanding. The abscissa axis of the time chart represents phase. As is apparent through a comparison with FIG. 11A, the phase of PWM2 is shifted by ($\Delta\theta\pm Td$) with respect to the phase of PWM1. PWM2 that is the second signal rises at $\theta_3'$ ($=\theta_3+\Delta\theta\pm Td$) and falls at $\theta_4'$ ($=\theta_4+\Delta\theta\pm Td$).

FIG. 12B, as well as FIG. 11B, shows a time chart for each of the current value $I_{C1}$ at the time when electromagnetic energy is stored in the first reactor L1 in the current value $I_1$ of the first converter circuit 32, the current value $I_{C2}$ at the time when electromagnetic energy is stored in the second reactor L2 in the current value $I_2$ of the second converter circuit 34 and the current value flowing through the switching element S3. The abscissa axis of the time chart also represents phase. FIG. 12C to FIG. 12F are views that show how $I_{C1}$ and $I_{D1}$ that constitute $I_1$ and $I_{C2}$ and $I_{D2}$ that constitute $I_2$ flow at each phase.

Because PWM1 is in the ON state and PWM2 is in the OFF state in a section in which the phase is from 0 degrees ($=\theta_1, \theta_3$) to $\theta_3'$, electromagnetic energy is stored in the first reactor L1 in the first converter circuit 32, and electromagnetic energy stored in the second reactor L2 is released in the second converter circuit 34. Therefore, as shown in FIG. 12C, $I_{C1}$ flows in the state shown in FIG. 3A, and $I_{D2}$ flows in the state shown in FIG. 4B. As shown in FIG. 12B, changes in $I_{C1}$ and $I_{C2}$ are such that, at the phase (0 degrees=$\theta_1, \theta_3$), $I_{C1}$ rises from zero to $I_{C1}$ and $I_{C2}$ remains at zero. Therefore, at a phase of 0 degrees ($=\theta_1, \theta_3$), the current value flowing through the S3 rises from zero to $I_{C1}$.

Because PWM1 and PWM2 are in the ON state in a section in which the phase is from $\theta_3'$ to $\theta_2$, electromagnetic energy is continuously stored in the first reactor L1 in the first converter circuit 32, and electromagnetic energy is stored in the second reactor L2 in the second converter circuit 34. Therefore, as shown in FIG. 12D, $I_{C1}$ flows in the state shown in FIG. 3A, and $I_{C2}$ flows in the state shown in FIG. 4A. As shown in FIG. 12B, changes in $I_{C1}$ and $I_{C2}$ are such that, at the phase $\theta_3'$, $I_{C1}$ remains at $I_{C1}$ and $I_{C2}$ rises from zero to $I_{C2}$. Therefore, at the phase $\theta_3'$, current flowing through the S3 rises from $I_{C1}$ to $(I_{C1}+I_{C2})$.

Because PWM1 is in the OFF state and PWM2 is in the ON state in a section in which the phase is from $\theta_2$ to $\theta_4'$, electromagnetic energy stored in the first reactor L1 is released in the first converter circuit 32, and electromagnetic energy is continuously stored in the second reactor L2 in the second converter circuit 34. Therefore, as shown in FIG. 12E, $I_{C1}$ flows in the state shown in FIG. 3B, and $I_{C2}$ flows in the state shown in FIG. 4A. As shown in FIG. 12B, changes in $I_{C1}$ and $I_{C2}$ are such that, at the phase $\theta_2$, $I_{C1}$ falls from $I_{C1}$ to zero and $I_{C2}$ remains at $I_{C2}$. Therefore, at the phase $\theta_2$, current flowing through the S3 falls from $(I_{C1}+I_{C2})$ to $I_{C2}$.

Because PWM1 and PWM2 are in the OFF state in a section in which the phase is from $\theta_4'$ to 360 degrees, electromagnetic energy stored in the first reactor L1 is continuously released in the first converter circuit 32, and electromagnetic energy stored in the second reactor L2 is released in the second converter circuit 34. Therefore, as shown in FIG. 12F, $I_{D1}$ flows in the state shown in FIG. 3B, and $I_{D2}$ flows in the state shown in FIG. 4B. As shown in FIG. 12B, changes in $I_{C1}$ and $I_{C2}$ are such that, at the phase $\theta_4'$, $I_{C1}$ remains at zero and $I_{C2}$ falls from $I_{C2}$ to zero. Therefore, current flowing through the S3 falls from $I_{C2}$ to zero at the phase $\theta_4'$.

When the on-off switching of the S3 is observed in FIG. 12A, the S3 changes from the OFF state to the ON state at the phase (0 degrees=$\theta_1$, $\theta_3$), and changes from the ON state to the OFF state at the phase $\theta_4'$. The S3 does not turn on or off at the phase $\theta_3'$, $\theta_2$ or $\theta_4$. On-off switching of the S3 does not occur in correspondence with the rising switching of PWM2 that is the second signal from the OFF state to the ON state at the time when P3 arises at the phase $\theta_3'$. That is, at the time of switching of the S3 from the OFF state to the ON state, on-off switching of the S3 does not occur in correspondence with rising switching of the second signal, which produces P3 in the state having the maximum loss value, from the OFF state to the ON state. When this is compared with FIG. 11A, because the phase of PWM2 is shifted by ($\Delta\theta\pm$Td) with respect to the phase of PWM1, an increase in $I_{C2}$ due to P3 in the state having the maximum loss value arises at the phase $\theta_3'$; however, $\theta_3'$ is included in the period in which the S3 is in the ON state, so the rising switching timing of the second signal at the time when P3 in the state having the maximum loss value arises does not overlap with the on-off switching timing of the S3. A maximum loss depends on whether there is on-off switching of the switching element S3, and, even when flowing current increases but when there is no actual on-off switching of the S3, a maximum loss does not arise. In this way, by executing phase control, it is possible to suppress the state having the maximum loss value.

Referring back to FIG. 9, the processing steps for the above-described phase control are shown in STEP44 and STEP52 subsequent to STEP38. In STEP52, $\Delta\theta$ is set such that $[\theta_1<\{\theta_3'=\theta_3+\Delta\theta\pm Td\}<\theta_2]$. The phase of overall PWM2 that is the second signal is shifted by ($\Delta\theta\pm$Td), so the phase $\theta_4$ at the falling edge of PWM2 is also shifted to $\theta_4'$ by ($\Delta\theta\pm$Td). In STEP52, $\{\theta_4'=\theta_4+\Delta\theta\pm Td\}$.

Figure 13A:
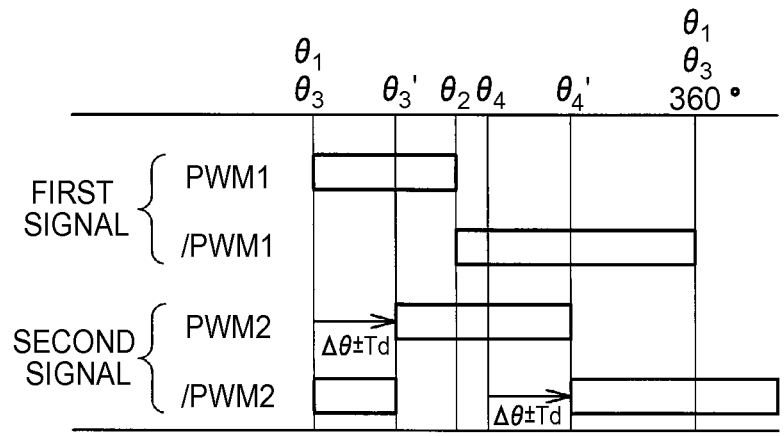
FIG. 13A and FIG. 13B are views that show ON-OFF states of the switching elements after phase control of FIG. 10 is executed.
Figure 13B:
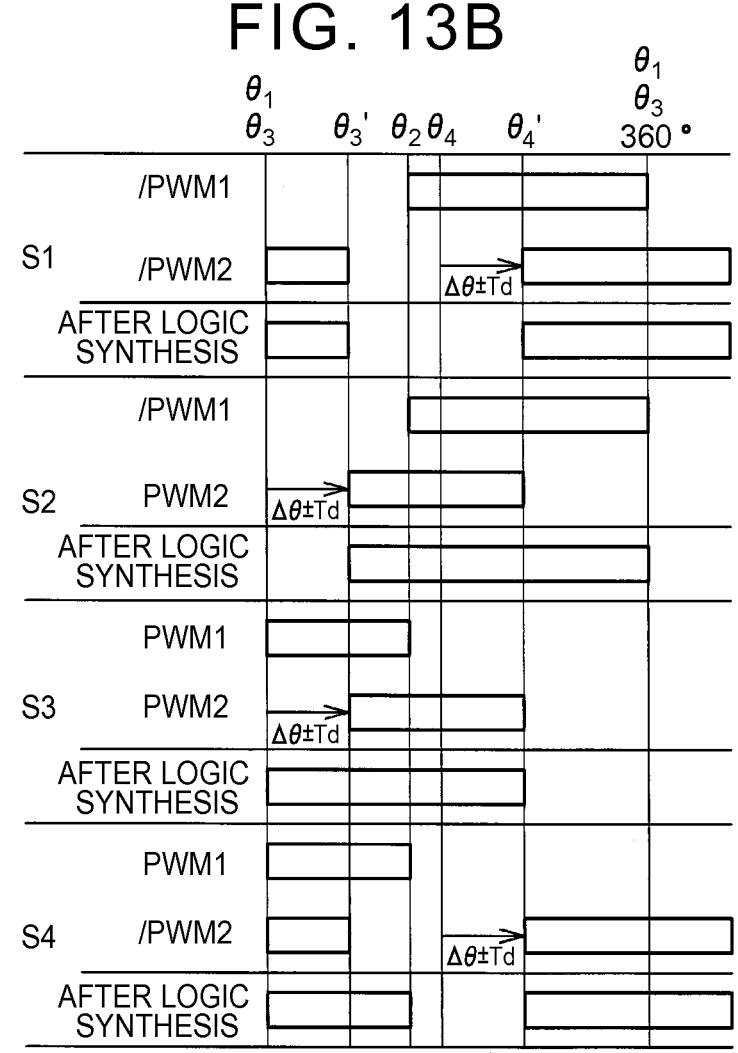

FIG. 13A and FIG. 13B are views that, as shown in FIG. 10(c), changes in four PWM signals at the time when the phase is shifted by ($\Delta\theta\pm$Td) with respect to the phase of PWM2 that is the second signal, and changes in the first signal, the second signal and the results of a logic synthesis of the first signal and second signal of each of the S1 to the S4. FIG. 13A shows changes in PWM1, /PWM1, PWM2 and /PWM2 that are the four PWM signals. FIG. 13B shows changes in the S1 to the S4 as a result of the changes in FIG. 13A. As shown in FIG. 13A, two signals, that is, PWM2 and /PWM2, change among the four PWM signals. Changes in the S1 to the S4 accordingly arise in all the S1 to S4 as shown in FIG. 13B. The view for the S3 in FIG. 13B is the same as the right-side view for the S3 in FIG. 10(c).

Figure 14A:
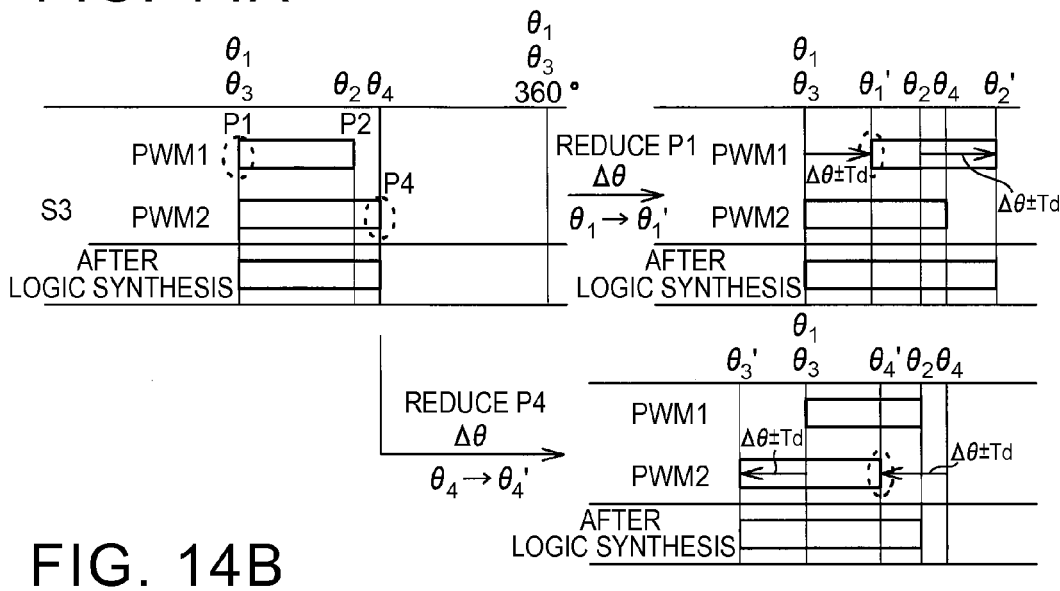
FIG. 14A and FIG. 14B are views that show specific examples other than FIG. 10.
Figure 14B:
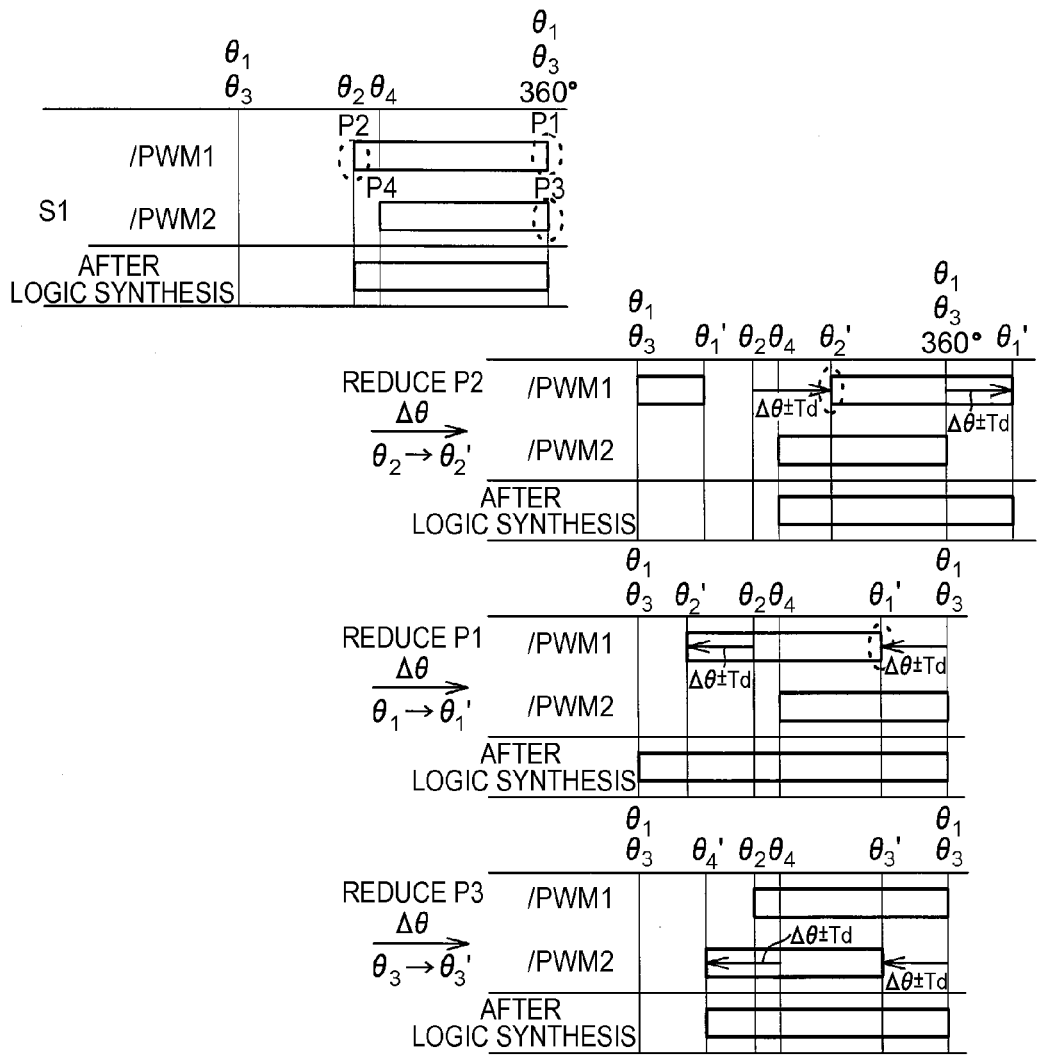

In the above-description, the case where the S3 is identified as a target of which the temperature is suppressed and P3 is determined as the state having the maximum loss value is described as a specific example. FIG. 14A and FIG. 14B are views that show phase control for a specific case other than the above.

FIG. 14A is a view that shows phase control at the time when the state having the maximum loss state is determined as a loss value other than P3 in the case where the S3 is identified as a temperature control target. The left-side view of FIG. 14A is a view that shows a state of the S3 before phase control is executed, and is the same as the state of the circled S3 in FIG. 10(c). Phase control at the time when P3 is determined is already described with reference to FIG. 10, so the states of the remaining P1, P2, P4 are observed.

A phase of $\theta_2$ corresponding to the switching timing of PWM1 that is the first signal from the ON state to the OFF state at the time when P2 arises is included between $\theta_3$ and $\theta_4$, which is the phase range in which PWM2 is in the ON state, so no on-off switching of the S3 occurs after the logic synthesis as a result of falling switching of the first signal from the ON state to the OFF state at the time when P2 arises. Therefore, no special phase control needs to be executed.

The phase $\theta_1$ at which the switching timing of PWM1 that is the first signal from the OFF state to the ON state arises at the time when P1 arises coincides with the phase $\theta_1$ of the rising edge of PWM2, so on-off switching of the S3 occurs after the logic synthesis as a result of rising switching of the first signal from the OFF state to the ON state at the time when P1 arises. For the purpose of reducing the loss of P1, the phase $\theta_1$ is shifted to a new phase $\theta_1'$ by ($\Delta\theta\pm$Td) such that the phase $\theta_1$ of the rising edge of PWM1 is included between $\theta_3$ and $\theta_4$, which is the phase range in which PWM2 is in the ON state. This state is shown in the right-side view of FIG. 14A.

Referring back to FIG. 9, this is the case where affirmative determination is made in STEP34. As for the process of phase control, in STEP48, $\Delta\theta$ is set such that $[\theta_3<\{\theta_1'=\theta_1+\Delta\theta\pm Td\}<\theta_4]$. The phase of overall PWM1 that is the first signal is shifted by ($\Delta\theta\pm$Td), so the phase $\theta_2$ of the falling edge of PWM1 is also shifted to $\theta_2'$ by ($\Delta\theta\pm$Td). In STEP48, $\{\theta_2'=\theta_2+\Delta\theta\pm Td\}$.

Referring back to FIG. 14A, because the phase $\theta_4$ of the timing at which falling switching of PWM2 that is the second signal from the ON state to the OFF state occurs at the time when P4 arises is not included between $\theta_1$ and $\theta_2$, which is the phase range in which PWM1 that is the first signal is in the ON state, on-off switching of the S3 occurs after the logic synthesis as a result of falling switching of PWM2 that is the second signal from the ON state to the OFF state at the time when P4 arises. For the purpose of reducing the loss of P4, the phase $\theta_4$ is shifted to a new phase $\theta_4'$ by ($\Delta\theta\pm$Td) such that the phase $\theta_4$ of the falling edge of PWM4 is included between $\theta_1$ and $\theta_2$, which is the phase range in which PWM1 is in the ON state. This state is shown in the lower-side view of FIG. 14A.

Referring back to FIG. 9, this is the case where negative determination is made in STEP38, and STEP46 and STEP54 are executed. As for the process of phase control, in STEP54, $\Delta\theta$ is set such that $[\theta_1<\{\theta_4'=\theta_4+\Delta\theta\pm Td\}<\theta_2]$. The phase of overall PWM2 that is the second signal is shifted by ($\Delta\theta\pm Td$), so the phase $\theta_3$ of the rising edge of PWM2 is also shifted to $\theta_3'$ by ($\Delta\theta\pm Td$). In STEP54, $\{\theta_3'=\theta_3+\Delta\theta\pm Td\}$.

As described above, in the case where the S3 is identified as a temperature control target, phase control at the time when the maximum loss state is determined as any one of P1 to P4 is executed.

For the S3, the first signal is PWM1 and the second signal is PWM2, so neither the first signal nor the second signal is the inversion signal of the PWM signal. As an example in which the PWM inversion signal is the first signal or the second signal, a state of phase control in the case where the S1 is identified as a target of which the temperature is suppressed is shown in FIG. 14B.

The left-side view in FIG. 14B is a view that shows a state of the S1 before phase control is executed, and is the same as the state of the S1 shown in FIG. 10(c). Assuming that any one of P1 to P4 is determined as the maximum loss state, the phase $\theta_4$ of the timing at which rising switching of /PWM2 that is the second signal from the OFF state to the ON state occurs at the time when P4 arises is included between $\theta_2$ and (360 degrees) $\theta_3$, which is the phase range in which /PWM1 that is the first signal is in the ON state, so no switching occurs after the logic synthesis as a result of rising switching of /PWM2 that is the second signal from the OFF state to the ON state at the time when P4 arises. Therefore, no special phase control needs to be executed. The remaining P2, P1, P3 need phase control.

Because the phase $\theta_2$ of the timing at which rising switching of /PWM1 that is the first signal from the OFF state to the ON state at the time when P2 arises is not included between $\theta_4$ and (360 degrees=) $\theta_3$, which is the phase range in which /PWM2 that is the second signal is in the ON state, on-off switching of the S1 occurs after the logic synthesis as a result of rising switching of /PWM1 that is the first signal from the OFF state to the ON state at the time when P2 arises. For the purpose of reducing the loss of P2, the phase $\theta_2$ is shifted to a new phase $\theta_2'$ by ($\Delta\theta\pm Td$) such that the phase $\theta_2$ of the rising edge of /PWM1 is included between $\theta_4$ and (360 degrees=) $\theta_3$, which is the phase range in which /PWM2 is in the ON state. This state is shown in the uppermost row in the right-side view of FIG. 14B.

Referring back to FIG. 9, this is the case where negative determination is made in STEP34, and STEP36 is executed. As for the process of phase control, in STEP50, $\Delta\theta$ is set such that $[\theta_3<\{\theta_2'=\theta_2+\Delta\theta\pm Td\}<\theta_4]$. The phase of overall /PWM2 that is the second signal is shifted by ($\Delta\theta\pm Td$), so the phase $\theta_3$ of the rising and falling edges of /PWM2 is shifted to $\theta_3'$ by ($\Delta\theta\pm Td$). In STEP50, $\{\theta_1'=\theta_1+\Delta\theta\pm Td\}$.

Referring back to FIG. 14B, because the phase (360 degrees=) $\theta_1$ of the falling switching timing of /PWM1 that is the first signal from the ON state to the OFF state at the time when P1 arises is not included between $\theta_4$ and (360 degrees=) $\theta_3$, which is the phase range in which /PWM2 that is the second signal is in the ON state, on-off switching of the S1 occurs after the logic synthesis as a result of falling switching of /PWM1 that is the first signal from the ON state to the OFF state at the time when P1 arises. For the purpose of reducing the loss of P1, the phase $\theta_1$ is shifted to a new phase $\theta_1'$ by ($\Delta\theta\pm Td$) such that the phase (360 degrees=) $\theta_1$ of the falling edge of /PWM1 is included between $\theta_4$ and (360 degrees=) $\theta_3$, which is the phase range in which /PWM2 is in the ON state. This state is shown in the middle row in the right-side view of FIG. 14B.

Referring back to FIG. 9, this is the case where affirmative determination is made in STEP34. As for the process of phase control, as is already described above, in STEP48, $\Delta\theta$ is set such that $[\theta_3<\{\theta_1'=\theta_1+\Delta\theta\pm Td\}<\theta_4]$, and $\{\theta_2'=\theta_2+\Delta\theta\pm Td\}$.

Referring back to FIG. 14B, because the phase (360 degrees=) $\theta_3$ of the timing at which falling switching of /PWM2 that is the second signal from the ON state to the OFF state occurs at the time when P3 arises coincides with the phase (360 degrees=) $\theta_1$ of the falling edge of /PWM1 that is the first signal, on-off switching of the S1 occurs after the logic synthesis as a result of falling switching of /PWM2 that is the second signal from the ON state to the OFF state at the time when P3 arises. For the purpose of reducing the loss of P3, the phase $\theta_3$ is shifted to a new phase $\theta_3'$ by ($\Delta\theta\pm Td$) such that the phase (360 degrees=) $\theta_3$ of the falling edge of /PWM2 is included between $\theta_2$ and (360 degrees=) $\theta_1$, which is the phase range in which /PWM1 is in the ON state. This state is shown in the lowermost row in FIG. 14B.

Referring back to FIG. 9, this is the case where negative determination is made in STEP34 and STEP36, and STEP38 is executed. As for the process of phase control, as is already described above, in STEP52, $\Delta\theta$ is set such that $[\theta_1<\{\theta_3'=\theta_3+\Delta\theta\pm Td\}<\theta_2]$, and $\{\theta_4'=\theta_4+\Delta\theta\pm Td\}$.

In this way, phase control for reducing the maximum loss is executed by setting the phase difference between the first signal and the second signal such that, when the determined timing is the rising timing or falling timing of the first signal, the determined timing of the first signal is shifted to the timing in the period in which the second signal is in the ON state; whereas, when the determined timing is the rising timing or falling timing of the second signal, the determined timing of the second signal is shifted to the timing in the period in which the first signal is in the ON state.

By executing phase control, it is possible to significantly reduce the switching loss, it is possible to decrease the temperature of each IGBT, and, in addition, it is possible to reduce the level of electromagnetic wave noise through a reduction in switching frequency. The above-described phase control is executed by the function of the phase control unit 50 of the controller 40.

Phase control for reducing the maximum loss is executed in the steps shown in FIG. 8 and FIG. 9; however, in some cases, it is possible to execute phase control for reducing the maximum loss in processing steps simpler than these steps.

Figure 15:
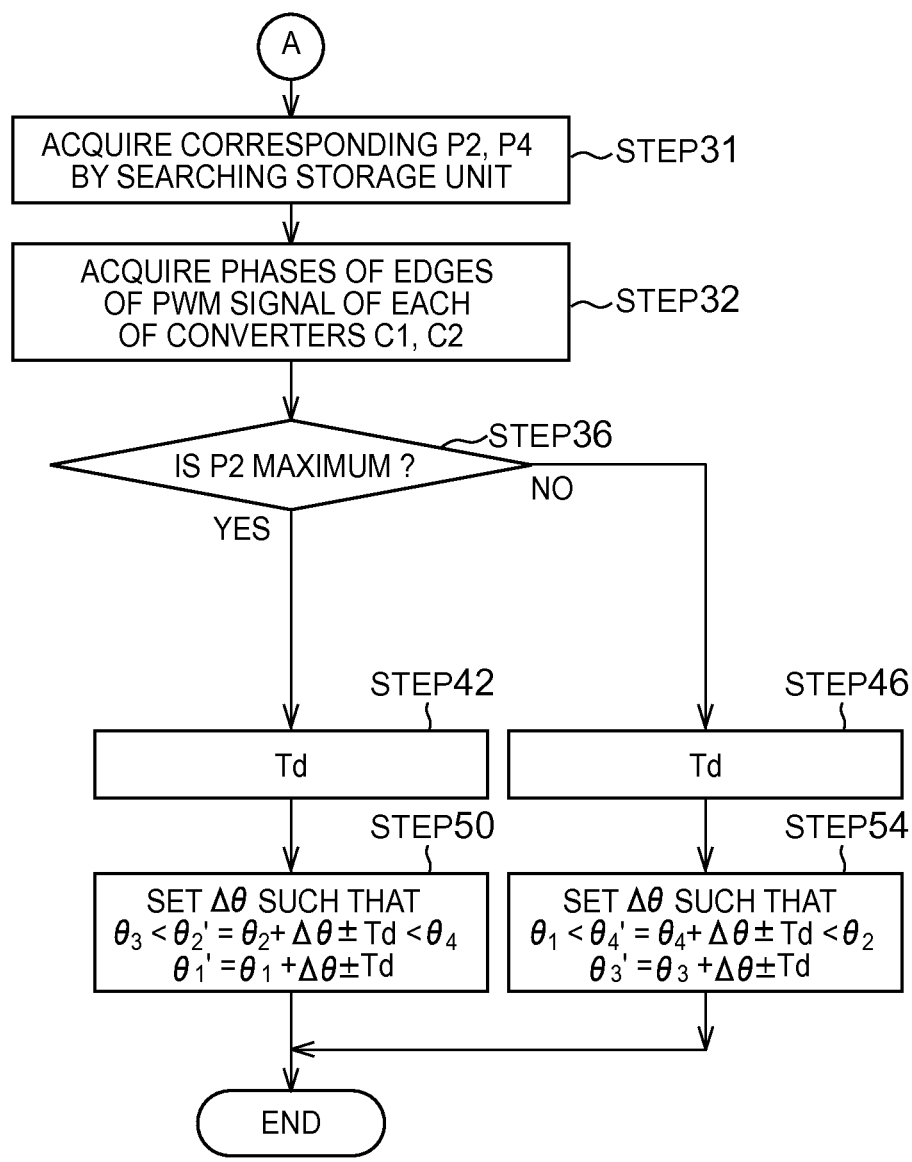
FIG. 15 is a flowchart that shows steps that are simpler than those of FIG. 9 in the electric power converter according to the embodiment of the invention.

In one example, in the configuration of the electric power converter 10, each of the on-off switching timing of the first signal and the on-off switching timing of the second signal is set such that the switching timing of the signal at which a maximum switching loss arises is the falling timing. FIG. 15 is a flowchart that shows the second half steps of phase control that may be executed in the case of the electric power converter 10 configured such that, for the first signal and the second signal, a loss value at the falling timing is larger than a loss value at the rising timing and the maximum switching loss arises at the falling timing of the first signal or the falling timing of the second signal. The first half steps are the same as those of FIG. 8.

In the power switching transistors, such as IGBTs, that are used for the switching elements S1 to S4, a loss value at the falling timing is mostly larger than a loss value at the rising timing. In the electric power conversion unit 20, the magnitude relation among the loss values P1 to P4 may be determined in advance, and, when P2, P4>P1, P3, the details of the loss state file 52 may be narrowed to only P2, P4.

Accordingly, in STEP31 that is executed first in the last half steps, it is only necessary to search for P2 and P4 instead of the processing step of searching for P1 to P4 in STEP30 of FIG. 9. The details of the process of STEP32 subsequent to STEP31 is the same as STEP32 described with reference to FIG. 9. When the process of STEP32 completes, it is subsequently determined which one of P2 and P4 is the maximum loss. P1 or P3 is not subjected to determination.

When P2 is the maximum, the process proceeds to STEP42; whereas, when P4 is the maximum, the process proceeds to STEP46. The details of STEP36, STEP42, STEP46, STEP50 and STEP54 are the same as STEP36, STEP42, STEP46, STEP50 and STEP54 shown in FIG. 9.

In this way, in the case of the electric power conversion unit 20 configured such that a loss value at the falling timing is larger than a loss value at the rising timing, it is possible to considerably reduce operation processing of phase control as compared to FIG. 9. In addition, substantially half of the amount of data are stored in the loss state file 52, so it is possible to reduce the memory capacity of the storage unit 42.

The next example is the case where the sum of the period in which the first signal is in the ON state and the period in which the second signal is in the ON state is longer than one period of PWM control. To completely eliminate the switching loss is not to carry out switching by continuously setting the switching elements in the ON state or in the OFF state over one entire period of PWM control. As shown in FIG. 7, even when the phase difference between the first signal and the second signal is 0 degrees, the switching element S4 is in the ON state over one entire period of PWM control, so the switching loss is zero. By further extending this configuration, the switching losses of as many of the switching elements as possible should be zero.

The sum of the first duty ratio DR1 of the PWM signal of the first converter circuit and the second duty ratio DR2 of the PWM signal of the second converter circuit is calculated, and, when (DR1+DR2) is larger than or equal to 1, the phase difference between the first signal and the second signal is controlled such that, in each of the switching elements, a period during which {(first signal is on) OR (second signal is on)} is satisfied extends over one entire period of PWM control.

When (DR1+DR2) exceeds 1, {(1-DR1)+(1-DR2)} is smaller than 1, so, by consulting FIG. 5 and FIG. 6, the switching elements other than the S1 are allowed to be set in the ON state continuously over one entire period of PWM control. When (DR1+DR2)=1, all the switching elements S1 to S4 are allowed to be set in the ON state continuously over one entire period of PWM control; however, in such a state, the electric power conversion unit 20 enters a short-circuit state, so any one of the switching elements is not set in the ON state continuously over one entire period of PWM control.

Figure 16:
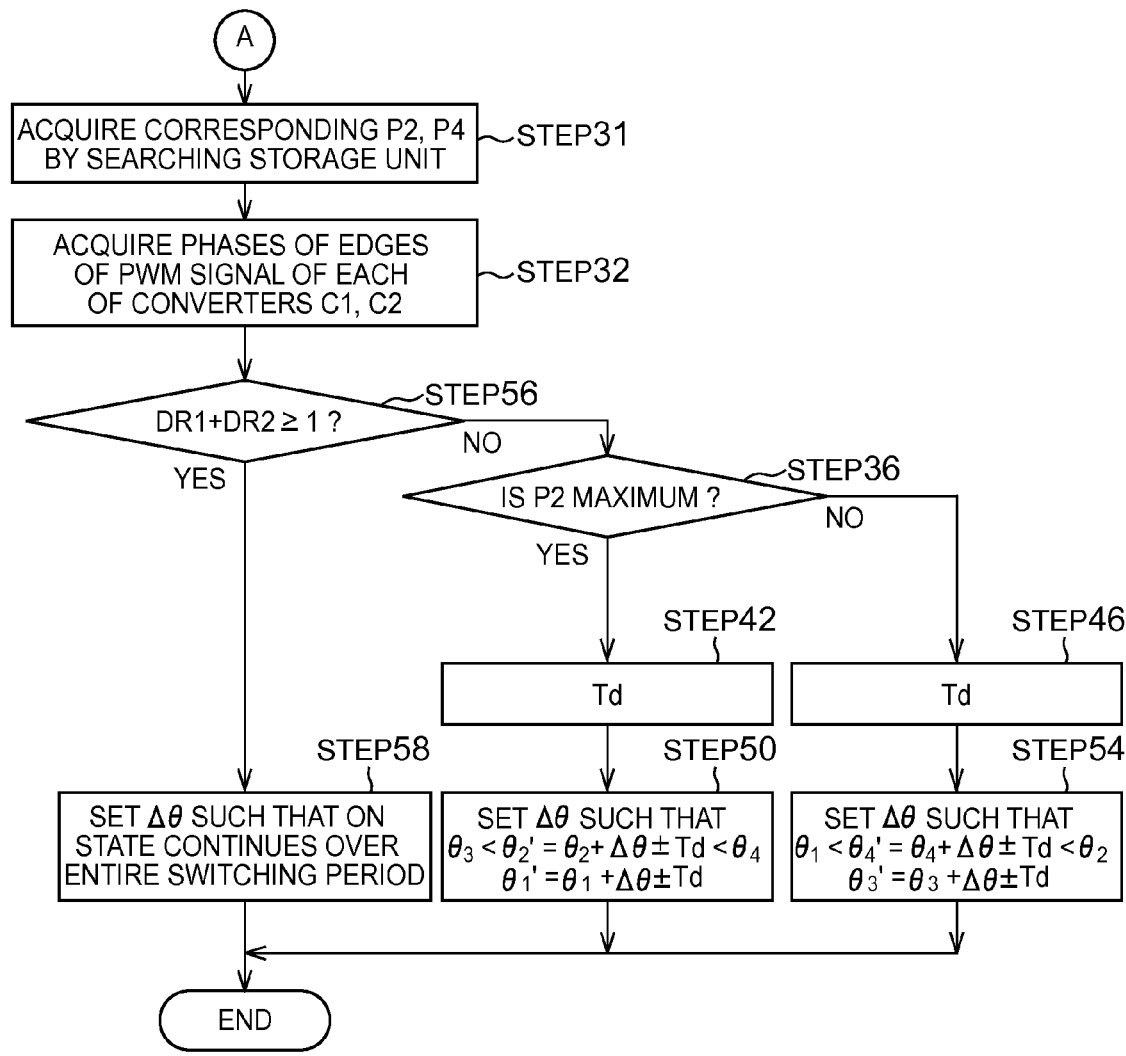
FIG. 16 is a flowchart that shows other steps that are simpler than those of FIG. 9 in the electric power converter according to the embodiment of the invention.

FIG. 16 is a flowchart that shows the second half steps of phase control in consideration of DR1 and DR2. The case based on the steps shown in FIG. 15 is shown. The details of STEP31 and STEP32 are the same as those of FIG. 15. Subsequent to STEP32, it is determined whether (DR1+DR2) is larger than or equal to 1 (STEP56). When negative determination is made, the processing steps described with reference to FIG. 15 are executed.

When affirmative determination is made in STEP56, $\Delta\theta$ for phase control is set such that the ON state continues over one entire period of PWM control (STEP58). Thus, up to three switching elements are allowed to be set in the ON state continuously over one entire period of PWM control.

Thus, for example, as compared to FIG. 15, it is possible to significantly reduce the switching loss, it is possible to decrease the temperatures of the IGBTs, and it is possible to further reduce the level of electromagnetic wave noise.

In further another example, the electric power converter 10 is configured such that a step-up ratio in electric power conversion between the first battery B1 and the output power line and a step-up ratio in electric power conversion between the second battery B2 and the output power line are determined in advance.

As described with reference to FIG. 1, the command signal, that is, the series mode-parallel mode signal 14, which is transmitted from the integrated controller of the vehicle, includes the output voltage value $V_O$, the output current value $I_O$, and the like, required of the load 12, so the step-up ratio of the first converter circuit 32 and the step-up ratio of the second converter circuit 34 are calculated based on the output voltage value $V_O$, the output current value $I_O$, and the like. The first duty ratio DR1 of the first converter circuit 32 is determined from the step-up ratio of the first converter circuit 32, and the second duty ratio DR2 of the second converter circuit 34 is determined from the step-up ratio of the second converter circuit 34. When DR1 and DR2 are determined, an applicable range of DR1 and an applicable range of DR2 in one period of PWM control are obtained.

This will be described with reference to FIG. 7. In FIG. 7, when the rising timing of DR1 is time $t_4$ and the falling timing is determined as $t_2$ in the next one period, the rising timing of DR1 is allowed to be changed only within the period of (1-DR1). That is, when DR1 is determined, an applicable range of DR1 within one period of PWM control is (1-DR1). Similarly, when DR2 is determined, an applicable range of DR2 within one period of PWM control is (1-DR2).

When the applicable range of DR1 and the applicable range of DR2 are obtained, because an applicable range of PWM1 that is the first signal and an applicable range of PWM2 that is the second signal are also the same ranges, the phase difference $\Delta\theta$ between PWM1 that is the first signal and PWM2 that is the second signal is set within a narrower one of the applicable range of DR1 and the applicable range of DR2. In the example of FIG. 7, (1-DR1) is narrower than (1-DR2), so the phase difference $\Delta\theta$ is allowed to be set as a phase difference within the range of (1-DR1).

In this way, when the step-up ratio is determined in advance, the phase difference $\Delta\theta$ between the first signal and the second signal is to be set to a phase difference within the applicable phase difference range under the step-up ratios determined in advance. For example, in the example of FIG. 7, because the applicable range of the phase difference is $(1-DR1)=(t_4-t_2)$, the phase difference $\Delta\theta$ between the first signal and the second signal is set to a phase difference within $(t_4-t_2)$. As one example, $\Delta\theta$ may be set to $\{(t_4-t_2)/2\}$ that is a median value among the phase differences in $(t_4-t_2)$. For example, when $(t_4-t_2)$ is 120 degrees as a specific example, the phase difference $\Delta\theta$ between the first signal and the second signal is fixedly set to (120 degrees/2)=60 degrees. In this way, when the phase difference $\Delta\theta$ is determined in advance based on the step-up ratio of the first converter circuit 32 and the step-up ratio of the second converter circuit 34, it is possible to significantly reduce load on operations that are executed at control intervals of phase control for suppressing the loss.

What is claimed is:
1. An electric power converter comprising:
a first battery;

a second battery;
a plurality of switching elements; and
a controller configured to execute ON-OFF control over the plurality of switching elements, wherein
the electric power converter has a parallel mode and a series mode, the electric power converter is able to switch between the parallel mode and the series mode,
in the parallel mode, electric power conversion between the first battery and an output power line and electric power conversion between the second battery and the output power line are individually carried out and the two electric power conversions are carried out in parallel with each other,
in the series mode, electric power conversion between both the first battery and the second battery and the output power line is carried out while the first battery and the second battery are connected in series with each other, and wherein
the controller is configured to:
  (i) in the parallel mode, control the electric power conversion between the first battery and the output power line with the use of a first PWM signal, control the electric power conversion between the second battery and the output power line with the use of a second PWM signal, determine an ON-OFF state of each of the plurality of switching elements based on a combination of a first signal, which is the first PWM signal or an inversion signal of the first PWM signal, and a second signal, which is the second PWM signal or an inversion signal of the second PWM signal, and set each of the switching elements in the ON state when the corresponding first signal or the corresponding second signal is in an ON state;
  (ii) determine a specific one of the plurality of switching elements, of which the number of switching times is suppressed;
  (iii) set a control phase of the first signal and a control phase of the second signal; and
  (iv) when the electric power converter operates in the parallel mode, set a phase difference between the first signal and the second signal for the specific switching element such that the second signal enters the ON state in a period in which the first signal is in the ON state or set the phase difference between the first signal and the second signal for the specific switching element such that the first signal enters the ON state in a period in which the second signal is in the ON state.

2. The electric power converter according to claim 1, wherein
the controller is configured to:
  (i) in the specific switching element, identify switching timing of a signal, at which a maximum switching loss arises, among switching losses that arise as a result of switching of the signal, that is, the switching between ON-OFF states of the first signal or the switching between ON-OFF states of the second signal; and
  (ii) set the phase difference such that switching timing between the ON-OFF states of the specific switching element does not overlap with the switching timing of the signal at which the maximum switching loss arises.

3. The electric power converter according to claim 2, wherein
the controller is configured to determine the switching loss based on a voltage value of the first battery, a voltage value of the second battery, a current flowing through each battery, and an output voltage of a load.

4. The electric power converter according to claim 2, wherein
the controller is configured to, when each of the switching timing between the ON-OFF states of the first signal and the switching timing between the ON-OFF states of the second signal is such that the switching timing of the signal, at which the maximum switching loss arises, is falling timing, determine whether the switching timing at which the maximum switching loss arises is the falling timing of the first signal or the falling timing of the second signal.

5. The electric power converter according to claim 1, wherein
the controller is configured to, when the sum of the period in which the first signal is in the ON state and the period in which the second signal is in the ON state is longer than one period of the PWM control, cause the specific switching element not to turn on or off over one period of the PWM control by setting the phase difference for the specific switching element such that a rising edge and falling edge of the first signal arise in the period in which the second signal is in the ON state or setting the phase difference such that a rising edge and falling edge of the second signal arise in the period in which the first signal is in the ON state.

6. The electric power converter according to claim 1, wherein
the controller is configured to, when the electric power converter is configured such that a step-up ratio in the electric power conversion between the first battery and the output power line and a step-up ratio in the electric power conversion between the second battery and the output power line are determined in advance, set the phase difference between the first signal and the second signal to a phase difference within an applicable phase difference range under the step-up ratios determined in advance.

* * * * *